US008275690B2

(12) United States Patent
Wallman

(10) Patent No.: US 8,275,690 B2
(45) Date of Patent: *Sep. 25, 2012

(54) METHOD AND APPARATUS FOR ENABLING SMALLER INVESTORS OR OTHERS TO CREATE AND MANAGE A PORTFOLIO OF SECURITIES OR OTHER ASSETS OR LIABILITIES ON A COST EFFECTIVE BASIS

(75) Inventor: Steven M. H. Wallman, Great Falls, VA (US)

(73) Assignee: FOLIOn, Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/701,286

(22) Filed: Feb. 5, 2010

(65) Prior Publication Data
US 2010/0205110 A1 Aug. 12, 2010

Related U.S. Application Data

(60) Continuation of application No. 10/627,646, filed on Jul. 28, 2003, now Pat. No. 7,685,046, which is a division of application No. 09/139,020, filed on Aug. 24, 1998, now Pat. No. 6,601,044, which is a continuation-in-part of application No. 09/038,158, filed on Mar. 11, 1998, now Pat. No. 6,996,539.

(51) Int. Cl.
*G06Q 40/00* (2012.01)
(52) U.S. Cl. ............................ 705/36 R; 705/35; 705/37
(58) Field of Classification Search .............. 705/35–37, 705/36 R
See application file for complete search history.

(56) References Cited

U.S. PATENT DOCUMENTS

| 4,346,442 A | 8/1982 | Musmanno |
| 4,376,978 A | 3/1983 | Musmanno |
| 4,412,287 A | 10/1983 | Bradock, III ................... 705/37 |
| 4,566,066 A | 1/1986 | Towers |

(Continued)

FOREIGN PATENT DOCUMENTS
JP 6-295300 10/1994
(Continued)

OTHER PUBLICATIONS

John C Perham, Stock Exchange Explains Its Pay-As-You-Go Plan, Barron's national Business and Financial Weekly, Aug. 24, 1953.*

(Continued)

*Primary Examiner* — Lindsay M Maguire
*Assistant Examiner* — Hao Fu
(74) *Attorney, Agent, or Firm* — Kenyon & Kenyon LLP

(57) ABSTRACT

Smaller investors can create and manage on a cost-effective basis a complex portfolio of securities using a mechanism that enables the investor to provide to the system the investor's preferences regarding his portfolio, to generate a portfolio, including fractional shares, that reflects the investor's preferences. The system then permits aggregation of the orders, and netting of orders, generated by multiple investors at various times during the day for execution. In addition, the structure of the computer-based system of the present invention allows its cost to be based on access to or usage of the system (such as a monthly fee) as opposed to by securities orders entered into the system as per common brokerage. The result is that the investor can create a portfolio of directly owned securities with attributes, such as diversification, similar to a mutual fund.

8 Claims, 16 Drawing Sheets

U.S. PATENT DOCUMENTS

| | | | |
|---|---|---|---|
| 4,597,046 A | | 6/1986 | Musmanno et al. |
| 4,642,768 A | | 2/1987 | Roberts |
| 4,648,038 A | | 3/1987 | Roberts et al. |
| 4,674,044 A | | 6/1987 | Kalmus et al. |
| 4,750,121 A | | 6/1988 | Halley et al. |
| 4,751,640 A | | 6/1988 | Lucas et al. |
| 4,774,663 A | | 9/1988 | Musmanno et al. |
| 4,910,676 A | | 3/1990 | Alldredge |
| 4,933,842 A | | 6/1990 | Durbin et al. |
| 4,953,085 A | | 8/1990 | Atkins |
| 4,980,826 A | | 12/1990 | Wagner |
| 4,989,141 A | | 1/1991 | Lyons et al. |
| 4,994,964 A | | 2/1991 | Wolfberg et al. |
| 5,038,284 A | | 8/1991 | Kramer |
| 5,101,353 A | | 3/1992 | Lupien et al. |
| 5,126,936 A | * | 6/1992 | Champion et al. ......... 705/36 R |
| 5,132,899 A | | 7/1992 | Fox |
| 5,148,365 A | | 9/1992 | Dembo |
| 5,155,847 A | | 10/1992 | Kirouac et al. |
| 5,193,056 A | | 3/1993 | Boes |
| 5,202,827 A | | 4/1993 | Sober |
| 5,210,687 A | | 5/1993 | Wolfberg et al. |
| 5,214,579 A | | 5/1993 | Wolfberg et al. |
| 5,220,500 A | | 6/1993 | Baird et al. |
| 5,227,967 A | | 7/1993 | Bailey |
| 5,262,942 A | | 11/1993 | Earle |
| 5,269,521 A | | 12/1993 | Rossides ................... 705/14.14 |
| 5,270,922 A | | 12/1993 | Higgins |
| 5,297,032 A | | 3/1994 | Trojan et al. |
| 5,375,055 A | | 12/1994 | Togher et al. |
| 5,497,317 A | | 3/1996 | Hawkins et al. |
| 5,517,406 A | | 5/1996 | Harris et al. |
| 5,649,116 A | | 7/1997 | McCoy et al. |
| 5,664,115 A | | 9/1997 | Fraser |
| 5,671,363 A | | 9/1997 | Cristofich et al. |
| 5,689,650 A | | 11/1997 | McClelland et al. |
| 5,689,652 A | | 11/1997 | Lupien et al. |
| 5,704,045 A | | 12/1997 | King et al. |
| 5,710,889 A | | 1/1998 | Clark et al. |
| 5,724,524 A | | 3/1998 | Hunt et al. |
| 5,729,700 A | | 3/1998 | Melnikoff |
| 5,745,706 A | | 4/1998 | Wolfberg et al. |
| 5,749,077 A | | 5/1998 | Campbell |
| 5,758,097 A | | 5/1998 | Debe et al. |
| 5,761,441 A | | 6/1998 | Bennett |
| 5,761,442 A | | 6/1998 | Barr et al. |
| 5,765,141 A | | 6/1998 | Spector |
| 5,774,881 A | | 6/1998 | Friend et al. |
| 5,784,696 A | | 7/1998 | Melnikoff |
| 5,794,219 A | | 8/1998 | Brown |
| 5,799,287 A | | 8/1998 | Dembo |
| 5,806,047 A | | 9/1998 | Hackel et al. |
| 5,806,049 A | | 9/1998 | Petruzzi |
| 5,812,987 A | | 9/1998 | Luskin et al. |
| 5,819,237 A | | 10/1998 | Garman |
| 5,845,266 A | | 12/1998 | Lupien |
| 5,873,071 A | | 2/1999 | Ferstenberg et al. |
| 5,918,217 A | | 6/1999 | Maggioncalda et al. |
| 5,918,218 A | | 6/1999 | Harris et al. |
| 5,924,082 A | | 7/1999 | Silverman |
| 5,930,762 A | | 7/1999 | Masch |
| 5,930,774 A | | 7/1999 | Chennault |
| 5,946,666 A | | 8/1999 | Nevo et al. |
| 5,960,411 A | | 9/1999 | Hartman et al. |
| 5,978,778 A | | 11/1999 | O'Shaughnessy |
| 5,999,918 A | | 12/1999 | Williams et al. |
| 6,012,042 A | | 1/2000 | Black et al. ................. 705/36 R |
| 6,014,643 A | | 1/2000 | Minton ....................... 705/36 R |
| 6,018,722 A | | 1/2000 | Ray et al. .................... 705/36 R |
| 6,021,397 A | | 2/2000 | Jones et al. |
| 6,035,287 A | | 3/2000 | Stallaert et al. |
| 6,044,352 A | | 3/2000 | Deavers |
| 6,078,904 A | * | 6/2000 | Rebane ....................... 705/36 R |
| 6,098,052 A | | 8/2000 | Kosiba et al. ................... 705/40 |
| 6,393,409 B2 | | 5/2002 | Young |
| 6,473,084 B1 | | 10/2002 | Phillips et al. ................ 345/440 |
| 6,601,044 B1 | | 7/2003 | Wallman |
| 6,799,167 B1 | | 9/2004 | Gullen et al. ............... 705/36 R |
| 6,952,808 B1 | | 10/2005 | Jamieson et al. ............. 715/833 |
| 6,996,539 B1 | | 2/2006 | Wallman ..................... 705/36 T |
| 7,110,971 B2 | | 9/2006 | Wallman |
| 7,117,176 B2 | | 10/2006 | Wallman |
| 7,454,378 B1 | | 11/2008 | White, Jr. ........................ 705/37 |
| 2010/0280971 A1 | | 11/2010 | Haskins et al. ............. 705/36 R |

FOREIGN PATENT DOCUMENTS

| | | |
|---|---|---|
| WO | WO 98/44443 | 10/1998 |
| WO | WO 98/44444 | 10/1998 |
| WO | WO 99/28845 | 6/1999 |

OTHER PUBLICATIONS

Jon Newberry, Bye bye broker, ABA Journal, Mar. 1998, vol. 84 p. 90, 1 pgs.*
Kathleen Pender, Stock Trading, San Francisco Chronicle, Jun. 23, 1986.*
Wall Street Journal, Frankfurt to Launch Trading System, Oct. 7, 1997. p. 14.*
"Welcome to DRIP Central" at http://www.dripcentral.com (2 pages), printed Feb. 20, 2001.
www.itginc.com/products/posit/posit_more.htm, Jun. 2000.
J.Z. Money, Apr. 1997, vol. 26, Issue 4, p. 82, Apr. 1997.
Business Wire p. 0699, Feb. 29, 2000.
Robert Barker, A Capital-Gains Miracle Worker, Business Week, Jan. 31, 2000, p. 130.
Anne Tergesen, Here Come the E-Funds, Business Week, Jan. 31, 2000, p. 125.
1998 ADP Investor Communications Services, ProxyEdge™ 2000.
Anonymous; Yearbook Supplement, pp. 95-99; Global Investor, 1995; seven pages.
Anonymous; The 1996 guide to Switzerland Supplement, pp. 2-5; Euromoney; Mar. 1996; seven pages.
Web Pages for "One Share of Stock Inc"; Internet web archive; Dec. 1996; five pages.
John Downes (Editor); Dictionary of Finance and Investment Terms; 1998; Barron's Educational Series, Inc.; Fifth Edition; p. 455.
Business Editors; Alaska Air Group Inc. Announcement; Business Wire; Sep. 1987; one page.
Pam Beach Post, Direct-buy stocks cut out middle man, Mar. 9, 1998, p. 17.
Jon Newberry, Bye bye broker, ABA Journal, Mar. 1998, vol. 84, p. 90.
Wall Street Journal, Frankfurt to Launch Trading System, Oct. 7, 1997, p. 14.
"Self-Regulatory Organizations; Filing of Proposed Rule Change by New York Stock Exchange, Inc. Relating to Amendment to Rule 411(b) Regarding the Entry of Odd-Lot Orders", Federal Register, Mar. 17, 1992, p. 9299, vol. 57, Issue 52, Washington, DC, US.
Margaret Dibben, Just let your fingers d'the dealing Cut-price services mean that calling your broker is no longer the preserve of the idle rich, The Guardian, Oct. 23, 1994.
95th Congress, 1st Session Committee Print, Report on Banks Securities Activities of the Securities and Exchange Commission Pursuant to Section 11A(e) of the Securities and Exchange Act of 1934 (public Law 94-29), Aug. 1977, pp. 3-101, US Government Printing Office, Washington, D.C.
Colby, Robert L. D., Response to Mar. 14, 1988 letter regarding "Exchange Act" from Spirer, Kenneth S., Apr. 14, 1988, pp. 1-12, Securities and Exchange Commission, Office of Chief Counsel, Division of Market Regulation, Washington, D.C.
Engel, Louis, et al., How to Buy Stocks, Eighth Edition, Little, Brown and Company, 1994, pp. 123-127, Canada.
Elgin, Peggie R., SPDR web ensnares both active, passive fund managers. (Standard & Poor's 500 Depository Receipts) (Investments & Benefits), Corporate Cashflow Magazine, Dec. 1, 1993.
Merrill Lynch, Pierce, Fenner & Smith Inc., Merrill Lynch announces a break for the small investor, 1974.
Perham, John C., Stock Exchange Explains Its Pay-As-You-Go Plan, Barron's National Business and Financial Weekly (1942-Current file), Aug. 24, 1953, 33,34 p. 6.
Rosenblat Alan, Response to Oct. 19, 1971 letter regarding The "Plan" from Reavis McGrath, Apr. 19, 1972, pp. 1-5, Securities and Exchange Commission, Office of Chief Counsel, Division of Corporate Regulation, Washington, D.C.

Rosenblat, Alan, Response to Dec. 5, 1974 Letter to SEC from Baron, Neil D., Nov. 23, 1975, pp. 1-8, Securities and Exchange Commission, Office of Chief Counsel, Division of Investment Management Regulation, Washington, D.C., 1975 Westlaw 11120.

Rosenblat, Alan, Response to Dec. 5, 1974 Request for No-Action letter from Baron, Neil D., Nov. 23, 1975, pp. 1-14, Securities and Exchange Commission, Office of Chief Counsel, Division of Investment Management Regulation, Washington, D.C.

Rosenblat, Alan, Response to letters of May 7, 1973 and May 13, 1973 regarding Investment Data Corporation and SEC No-Action Letter from Dudley, John A., Jun. 15, 1973, pp. 1-7, Securities and Exchange Commission, Office of Chief Counsel, Division of Investment Management Regulation, Washington, D.C., 1973 Westlaw 6859.

Rosenblat, Alan, Response to Oct. 19, 1971 Letter to SEC from Reavis & McGrath, May 21, 1972, pp. 1-3, Securities and Exchange Commission, Office of Chief Counsel, Division of Investment Management Regulation, Washington, D.C., 1972 Westlaw 12253.

Sharpe, William F., The Sharpe Ratio, The Journal of Portfolio Management, Fall 1994, New York, N.Y.

Markowitz, Harry M.: "Efficient Portfolios, Sparse Matrices, and Entities: A Retrospective", Operations Research (0030-364X), 2002, vol. 50, No. 1, pp. 154-160.

Bernstein Research: Strategic Decisions Conference Jun. 3, 4 and 5, 2003, Black Book, 104 pages.

"Waste Management Announces Odd-Lot Selling Program," PR Newswire, Jan. 9, 1990, retrieved from [URL:http://www.highbeam.com/doc/1G1-8028560.html].

"NYSE Will Use Crossing Network to provide After-Hours Trading." Trading Systems Technology, vol. 4, No. 6, Sep. 24, 1990.

Hasbrouck et al. "New York Stock Exchange Systems and Trading Procedures." NYSE Working Paper #93-01, Draft 1.2, Apr. 27, 1993, pp. 1-60.

Maidenberg, H.J., "Futures/Options; Silver Climbs by Limit in a Shortened Session." New York Times, Late City Final Edition ED, col. 5, p. 20, May 5, 1987.

* cited by examiner

1. YEAR OF BIRTH: _____
2. YEAR OF RETIREMENT: _____
3. MARITAL STATUS (m/s): _____
4. NUMBER OF CHILDREN: _____
5. YEAR FIRST CHILD ATTENDS COLLEGE: _____
6. YEAR SECOND CHILD ATTENDS COLLEGE: _____
7. YEAR THIRD CHILD ATTENDS COLLEGE: _____
8. YEAR FOURTH CHILD ATTENDS COLLEGE: _____
9. COST OF ONE YEAR OF COLLEGE: $_____
10. INCOME: $_____
11. LIQUID ASSETS: $_____
12. LIABILITIES: $_____
13. SPOUSE YEAR OF BIRTH: _____
14. ANNUAL INCOME NEEDED AT RETIREMENT: $_____
15. NUMBER OF LIVING PARENTS TO CARE FOR: _____
16. YEAR OF BIRTH OF FIRST LIVING PARENT: _____
17. YEAR OF BIRTH OF SECOND LIVING PARENT: _____
18. YEAR OF BIRTH OF THIRD LIVING PARENT: _____
19. YEAR OF BIRTH OF FOURTH LIVING PARENT: _____
20. ANNUAL COST OF CARE FOR LIVING PARENT: $_____
21. RISK FACTOR (1-10, WHERE 10 IS HIGH): _____

FIG.2

OUTPUT OF ASSET ALLOCATION MODEL

TO REACH YOUR ANNUAL INCOME AT RETIREMENT, GIVEN THE LIMITATIONS AND NEEDS YOU HAVE SPECIFIED, YOU MUST INVEST ANNUALLY IN THE FOLLOWING MANNER:

1. LONG-TERM INVESTMENTS: $20,000
2. MEDIUM-TERM INVESTMENTS: $10,000
3. SHORT-TERM INVESTMENTS: $5,000

FIG.3

PORTFOLIO SELECTION EDITOR SCREEN

1. PRICE TO EARNINGS (P/E) LIMIT: _____
2. CAPITALIZATION FLOOR ($MILLIONS): _____
3. SPECIFIC SECTORS
    a. TELECOMMUNICATIONS: _____
    b. SOFTWARE: _____
    c. COMPUTER: _____
    d. MANUFACTURING: _____
    e. CHEMICAL: _____
    f. BANKING: _____
    g. TRANSPORTATION: _____
    h. MEDICAL: _____
    i. INSURANCE: _____
    j. REAL ESTATE: _____
    k. ENTERTAINMENT: _____
    l. OIL: _____
    m. ENERGY: _____
    n. UTILITIES: _____
4. EXCLUDE COMPANIES WITH NEGATIVE MANAGEMENT PRACTICES (SEE DEFINITION IN HELP): _____
5. EXCLUDE COMPANIES WITH NEGATIVE LABOR PRACTICES (SEE DEFINITION IN HELP): _____
6. EXCLUDE COMPANIES WITHOUT ORGANIZED LABOR WORKFORCES: _____
7. INCLUDE EMPLOYEE OWNED COMPANIES: _____
8. INCLUDE ENVIRONMENTALLY GREEN COMPANIES: _____
9. INCLUDE ONLY DOMESTIC COMPANIES: _____
10. INCLUDE FOREIGN COMPANIES: _____
11. RISK LIMIT RELATIVE TO S&P 500: _____
12. RATE OF RETURN LIMITATION RELATIVE TO S&P 500: _____

FIG.4A

CATEGORIES OF STARTING POINTS FOR PORTFOLIO CREATION

| INDICES & STRATEGIES | AFFINITY GROUPS | TYPES OF STOCKS | SIMILAR DEMOGRAPHICS | RECOMMENDED PORTFOLIOS | DEFAULT |
|---|---|---|---|---|---|
| • S&P 500<br>• DOW JONES 30 INDUSTRIALS<br>• RUSSELL 2000<br>• 10 UNDERPERFORMING STOCKS OF THE DOW<br>• . . . | • CEO's<br>• CFO's<br>• FUND MANAGERS<br>• STOCKBROKERS<br>• LAWYERS IN D.C.<br>• UNIONS<br>• CHARITIES<br>• ENGINEERS IN SILICON VALLEY<br>• . . . | • LARGE CAPS<br>• SMALL CAPS<br>• ASIAN STOCKS ON NYSE<br>• UNDER PERFORMING STOCKS<br>• HIGH TECH STOCKS<br>• . . . | • AGE<br>• INCOME BRACKET<br>• MARITAL STATUS<br>• NUMBER OF CHILDREN<br>• . . . | • FORBES<br>• MONEY MAGAZINE<br>• WASHINGTONIAN<br>• . . . | • SYSTEM DEFAULT PORTFOLIO |

FIG.4B

| COMPANY | RISK RELATIVE TO S&P 500 (TWELVE MONTH VALUES) | DIFFERENTIAL RATE OF RETURN RELATIVE TO S&P 500 (LAST 12 MONTHS) |
|---|---|---|
| 1. COMPANY A (2.5%) | 0.91 | −10% |
| 2. COMPANY B (2.5%) | 0.89 | −11% |
| 3. COMPANY C (2.5%) | 0.95 | −5% |
| 4. COMPANY D (2.5%) | 0.94 | −6% |
| 5. COMPANY E (2.5%) | 0.93 | −7% |
| 6. COMPANY F (2.5%) | 0.98 | −2% |
| 7. COMPANY G (2.5%) | 1.10 | +10% |
| 8. COMPANY H (2.5%) | 1.12 | +12% |
| 9. COMPANY I (2.5%) | 0.95 | −4% |
| 10. COMPANY J (2.5%) | 0.90 | −10% |
| 11. COMPANY K (2.5%) | 0.70 | −20% |
| 12. COMPANY L (2.5%) | 1.13 | +11% |
| 13. COMPANY M (2.5%) | 1.5 | +20% |
| 14. COMPANY N (2.5%) | 0.8 | −15% |
| 15. COMPANY O (2.5%) | 1.4 | +12% |
| 16. COMPANY P (2.5%) | 1.2 | +10% |
| 17. COMPANY Q (2.5%) | 1.01 | +1% |
| 18. COMPANY R (2.5%) | 0.99 | −0.1% |
| 19. COMPANY S (2.5%) | 1.15 | +12% |
| 20. COMPANY T (2.5%) | 1.7 | +25% |
| 21. COMPANY U (2.5%) | 1.72 | +26% |
| 22. COMPANY V (2.5%) | 1.55 | +20% |
| 23. COMPANY W (2.5%) | 0.88 | −10% |
| 24. COMPANY X (2.5%) | 0.77 | −15% |
| 25. COMPANY Y (2.5%) | 0.99 | −1% |
| 26. COMPANY Z (2.5%) | 1.22 | +18% |
| 27. COMPANY AA (2.5%) | 1.33 | +22% |
| 28. COMPANY AB (2.5%) | 0.88 | −11% |
| 29. COMPANY AC (2.5%) | 0.9 | −1% |
| 30. COMPANY AD (2.5%) | 1.14 | +11% |
| 31. COMPANY AE (2.5%) | 1.9 | +29% |
| 32. COMPANY AF (2.5%) | 0.6 | −30% |
| 33. COMPANY AG (2.5%) | 0.77 | −15% |
| 34. COMPANY AH (2.5%) | 0.9 | −10% |
| 35. COMPANY AI (2.5%) | 0.92 | −8% |
| 36. COMPANY AJ (2.5%) | 0.91 | −9% |
| 37. COMPANY AK (2.5%) | 0.6 | −30% |
| 38. COMPANY AL (2.5%) | 1.15 | +10% |
| 39. COMPANY AM (2.5%) | 1.55 | +25% |
| 40. COMPANY AN (2.5%) | 1.91 | +30% |

FIG.5

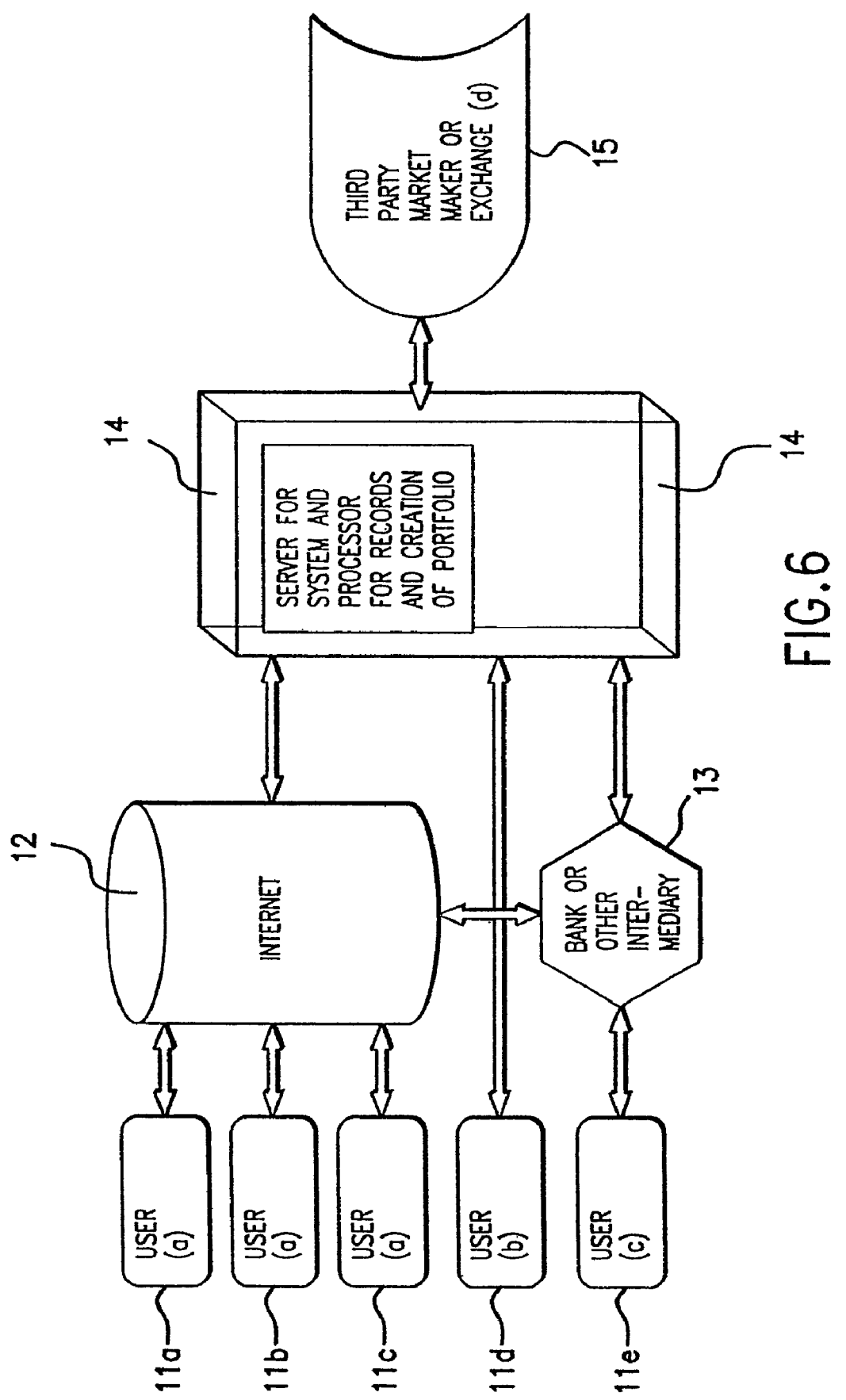

SAMPLE RESULTS FROM
USER SELECTIONS AND INDIVIDUAL PORTFOLIO PROCESSING
AS PER FIG 10(48)

| USER BY RESULT OF PORTFOLIO ADJUSTMENT | SECURITY A | | SECURITY B | | SECURITY C | |
|---|---|---|---|---|---|---|
| | BUY | SELL | BUY | SELL | BUY | SELL |
| USER A | 100 | | 200 | | 100 | |
| USER B | | 50 | | 50 | | 100 |
| USER C | 150 | | | 150 | | 50 |
| NUMBER OF TRADES UNDER TRADITIONAL BROKERAGE; TOTAL=9 | 2 | 1 | 1 | 2 | 1 | 2 |

FIG.11

SAMPLE RESULTS FROM
AGGREGATION OF INDIVIDUAL PORTFOLIOS PROCESSED THROUGH THE
PRESENT INVENTION'S ALGORITHM'S USED IN FIG 10(49)

| TOTALS | 250 | 50 | 200 | 200 | 100 | 150 |
|---|---|---|---|---|---|---|
| NET USER TRADES | 200 | | 0 | | | 50 |
| NUMBER OF TRADES WITH THE PRESENT INVENTION (NO NETTING) | 1 | 1 | 1 | 1 | 1 | 1 |
| NETTED=2 | 1 | | | | | 1 |

FIG.12

METHOD AND APPARATUS FOR ENABLING SMALLER INVESTORS OR OTHERS TO CREATE AND MANAGE A PORTFOLIO OF SECURITIES OR OTHER ASSETS OR LIABILITIES ON A COST EFFECTIVE BASIS

RELATIONSHIP TO OTHER APPLICATIONS

This is a continuation of U.S. patent application Ser. No. 10/627,646 filed 28 Jul. 2003, which is a divisional application of U.S. patent application Ser. No. 09/139,020, filed Aug. 24, 1998, U.S. Pat. No. 6,601,044, which is a continuation in part of U.S. patent application Ser. No. 09/038,158, filed Mar. 11, 1998, both of which are hereby incorporated by reference as if repeated herein in their entirety, including the drawings.

BACKGROUND OF THE INVENTION

The present invention relates generally to methods and apparatuses for electronically trading and investing in securities or other assets, rights or liabilities, such as commodities or futures. More particularly, the present invention relates to a method and apparatus for electronically trading over wired and wireless networks, including over the Internet, and investing in securities or other assets, rights or liabilities that enables a user, at a reasonable cost, to create and manage a complex and diversified portfolio of such securities or other assets, rights or liabilities.

Currently, small investors generally have two choices with regard to making investments in securities. First, they can acquire directly shares or derivatives on shares (for example, buy 1000 shares of Microsoft or an option on Microsoft stock) or can acquire directly a derivative that derives its value from multiple securities (such as an option on the Dow Jones Industrials). In this instance of direct purchases (through "brokerage"), the investor is the actual owner of the particular security or derivative. (Where the investor owns a derivative security, the investor generally has no ownership interest in the underlying securities, which determine the value of the derivative). Second, these investors can purchase an interest in an intermediary (which interest could itself be a security), such as a trust, corporation or other business vehicle that derives its value from multiple other securities (such as a trust that contains a portfolio of stocks like the stocks that comprise the S&P 500, or a portfolio of other stocks). This second category of intermediary products is principally comprised of open-end mutual funds (such as the Fidelity, Vanguard, Scudder and other mutual funds) that invest in other securities, but also includes closed-end mutual funds, unit trusts and other vehicles, and is referred to collectively herein as "funds." In this second case where the investing is done through an intermediary vehicle, the investor owns an interest in the vehicle. That vehicle in turn owns the underlying securities (as in a mutual fund). Each of these two traditional investment strategies—either (i) trading individual securities or derivatives through brokerage, or (ii) investing in funds—has disadvantages for the investor, which are described below.

A. Chief Among The Structural Disadvantages Inherent in the Fund Product are:

1. Inability to Select Securities or Monitor Selection of Securities.

An investor in a fund is precluded from selecting the individual securities (or derivatives, which unless otherwise noted are hereinafter included in "securities") to be included in, or excluded from, the fund's portfolio.

An investor can attempt to select the general type of securities to be included in the investor's overall asset allocation by investing in a targeted fund that, for example, states it will invest exclusively in companies whose business is primarily computer software. But that selection still provides the manager of the selected fund with wide discretion to select from hundreds of securities.

In addition, except for some targeted funds, it is not possible for the investor to express any preferences—even general ones—regarding matters such as social or moral issues (such as not wanting to, or only wanting to, invest in companies that engage in business with certain governments or have operations in certain sectors, such as defense). Even in those few instances where a targeted fund exists for those types of preferences, the preferences that the investor can have reflected are, at best, very general with the investor having no ability to select specific stocks, either to include or exclude, from the portfolio.

It is also not possible for the investor to control what specific securities a fund will hold in its portfolio, or with what weighting or amounts. An investor could select a fund that reflects, for example, an index, but the fund then invests in whatever securities, and with whatever weighting, comprises the index. Consequently, when the investor invests in a fund, the investor may be investing in securities in which the investor would otherwise prefer not to have an interest, or not as much of an interest. In addition, an investor that invests in multiple funds or that holds other investment securities other than solely one fund, will likely be overweighted or under weighted in particular industries or stocks frequently without his knowledge, and without any mechanism to correct the allocation.

2. Inability To Control Tax Effects.

An investor in a fund receives ordinary income distributions at the discretion (subject to certain legal constraints), and depending on the management style, of the fund. Funds that churn portfolios generate more transactions than funds that do not, but the taxable distributions are dependent on the fund's activities—not the investor's.

In most funds, such as typical open-end mutual funds (which account for the overwhelming bulk of all diversified investment vehicles with such funds holding a remarkable $4 trillion of investor money), net tax gains "flow through" to the investor. In other words, an investor is saddled with whatever flow through tax gain the manager's activities have generated—and such gains are taxed at ordinary income rates. The investor has no control over these effects whatsoever, and can be in a position of having to pay tax on gains earned by the fund even where the investor has engaged in no transaction in the fund during the year. Moreover, taxable loses cannot be distributed by a fund—only taxable gains. Consequently, an investor can only receive a tax liability from the fund, not a tax benefit.

To attempt to avoid these problems, some investors with sufficiently large holdings to make it worthwhile can engage in complex tax strategies to obtain some flexibility, but those strategies are expensive to implement and not useful for smaller investors.

Alternatively, an investor can invest in a fund that attempts to limit the fund's uncontrollable tax effects. For example, a fund that engages in no selection of stocks—such as an index fund or a fund that simply invests in the largest 500 or 1000 corporations—would have little turnover from a manager buying or selling securities in order to adjust the portfolio's holdings. Even in these funds, however, there are purchases and sales by the fund to reflect redemptions or cash contributions by investors. As more investors buy into the fund, the manager buys more of the specified securities. As redemptions occur, the manager sells some of the securities to obtain cash to pay to the fund holders who are redeeming their interests in the fund. Consequently, if there was a net gain on those transactions, holders in these funds, which are generally tax flow-through funds, will receive a taxable gain, regardless of their desire. (While such a fund has net inflows of investments from investors, there will be no or little tax effect because the fund will, almost exclusively, be acquiring securities. When the fund eventually has net outflows, however, limiting the tax effects will be far more difficult.)

3. Inability To Manage Tax Effects.

Invariably, some securities in a fund will have depreciated while the fund overall has appreciated (or vice-versa). It is not possible for the investor in an appreciated fund to make the choice to obtain a capital loss by selling depreciated securities (and the fund itself cannot pass through losses). Conversely, it is also not possible for an investor to make the choice to obtain a capital gain by selling the appreciated assets in a fund that has depreciated overall. Those transactions in particular securities are made at the discretion of the fund manager for the fund as a whole and affect all investors in the fund.

In those few types of diversified investment vehicles where the tax effects do not flow through, the investor does not obtain any gain or loss from the appreciation or depreciation in the underlying assets. The investor can only sell part or all of his interest in the entire fund, which will either result in a gain or a loss depending on whether the fund has appreciated or depreciated as a whole relative to the investor's tax basis in the fund.

In all instances, flow through or not, the investor cannot sell some of the securities in the fund, and therefore has no ability to manage for his own benefit the various tax effects that originate from the underlying securities in the fund.

4. Inability to Exercise Shareholder Rights or Rights Regarding Reinvestment or Distributions, Etc.

As noted, securities held in a fund are owned by the fund, not the investor who merely holds an interest in the fund. Consequently, the investor in a fund has no right to vote the underlying securities, tender (or not tender) them in a takeover contest, elect to receive a reinvestment of dividends, elect to receive a dividend as stock instead of cash, exercise any preemptive rights, or otherwise exercise any other shareholder franchise or other shareholder right that may exist with regard to the securities held in the fund.

5. Inability to Modify or Control Costs.

With funds, there are two types of charges: Charges levied upon an investor directly for buying, selling or holding interests in the fund, and charges levied against the fund for managing, advising and providing other services to the fund. Although an investor may be in a position to regulate to some degree the charges directly incurred, either by buying or selling less frequently, or by buying directly from a fund as opposed to through a broker or other intermediary (such as a bank or insurance company) that charges a fee or load, the investor cannot affect or control the charges levied against the fund. Those charges which frequently are based on a percentage of assets under management, are paid by the fund and serve to reduce the returns, or increase the losses, of the fund.

6. Inability to Make Intra Day Modifications.

An investor in a fund can make only one investment decision—namely to buy or sell interests in the fund. Because of the structure of open-end mutual funds (the overwhelmingly dominant type of fund), that decision is effective only once per day. For example, an investor who believes the market is going down, or who believes it may be going down during the morning but then believes it is going up in the afternoon has no mechanism, through an open-end mutual fund, to buy based on intra-day prices. All open-end mutual funds are priced as of the close of business—in fact prices are available for such funds only once per day; and all investors—whether buying or selling and regardless of when their order was placed during the day—receive a price as of the close of business. This lack of execution flexibility is an important consideration for some investors and one that forces them to use brokerage or other vehicles as opposed to mutual funds for their investing.

Certain funds other than open-end mutual funds, such as closed-end funds or some trusts, as well as derivative securities, do trade during the day and therefore can reflect intra-day price movements. Each of these other vehicles, however, has negative characteristics that have made them unpopular with investors, including discounts to fair market value of the underlying securities, less transparency than open-end mutual funds or relatively unchangeable, static portfolios, and they are not generally viewed as substitutes for an open-end mutual fund. In addition, in these vehicles as well, the investor buys or sells only an interest in the fund, not the securities owned by the fund.

7. Inability to Monitor and Control Risk Levels and "Styles" of Investing.

An investor in a fund can receive historical information as to risk and returns for the fund. Mutual funds that are actively managed—as opposed to passively managed indexed funds or static portfolio trusts—are managed by individuals, and frequently by teams of individuals, making buy and sell decisions. When some of those individuals depart the fund, the "style" of investing of the fund may change. Even if those individual managers never depart the fund, the market may present them with fewer or greater opportunities to buy or sell securities under a particular "style" than they had before. Or their views as to the market may change and with it their investment mix. Some investors in these funds accept these changes in style and direction and view that as part of what they are paying for with the management fee. Others, however, attempt to select funds based on the funds' supposed risk, sector of interest and other factors (including previous returns or returns relative to an index). It is not possible to control those factors in these funds in advance, however, unless the fund commits to a mechanical style of investing with extremely limited discretion—which is typical for an index fund but very rare for an actively managed fund.

8. Inability to Switch Fund Families or Funds without Consequences.

Because funds are organized and managed by particular investment company advisers, they are proprietary to a particular fund complex. Consequently, if for example, an investor were in invested in a Fidelity S&P 500 fund and wished to switch to a Vanguard S&P 500 fund because, for example, the fees were lower or because for example the investor switched jobs and her employer was offering Vanguard instead of Fidelity, then the investor would have to sell all her interest in the Fidelity fund and buy an interest in the Vanguard fund. Unless the interests were held in tax advantaged accounts like a 401(k) account, that transaction would be taxable. Indeed, even switching from one Fidelity fund to another Fidelity fund is taxable (unless the interests were held in tax advantaged accounts).

9. Inability to Manage Multiple Investments as a Whole.

When an investor is invested in multiple funds, it is very difficult for the investor to understand the overall portfolio characteristics of their investment. In other words, many investors may have one or a few investments in funds in 401(k) or other retirement accounts, and then a few other fund investments or individual stock investments outside of their retirement accounts. These investors generally do not manage their overall portfolio of multiple funds and individual stock holdings as a whole managed portfolio, because it is very difficult to discern the overall risk and return of the integrated portfolio of multiple funds and individual stocks. Of course, it is that integrated portfolio that will, ultimately, provide returns for the investor. Some investors pay to have multiple funds managed by investing in "funds of funds" that attempt to do that for them. Even here, the investor's portfolio does not include, for purposes of determining whether the investor's overall portfolio is being managed well, those funds that are not part of the "fund of funds" complex, or individual stocks held by the investor.

B. Chief Among the Structural Disadvantages Inherent in the Brokerage Service are:

1. Inability to Create a Diversified Portfolio on a Cost Effective Basis.

Under portfolio theory, an investor should seek to create a diversified portfolio when investing. Diversification provides an investor with a similar return with lower risk, or a higher return with the same level of risk, as a non-diversified portfolio. Simply put, portfolio theory dictates that there is no advantage to an ordinary investor in holding a non-diversified portfolio of publicly-traded securities as opposed to a diversified portfolio. Nevertheless, few smaller investors are able to create a diversified portfolio. The obstacles to creating such a portfolio for the smaller investor have been the inability of the ordinary investor to be able to craft such a portfolio on his own, combined with the costs of engaging in the trading necessary to create and maintain such a portfolio, and the inability to consummate trades in small quantities needed to create such a portfolio. Consequently, most investors who have understood the benefits, or at least understood that there is a benefit, from diversification have turned to mutual funds. And that desire for diversification has been a primary factor in the explosive growth of such funds, notwithstanding all of the disadvantages of investing in mutual funds as described above. Simply put, the concept underlying brokerage has been the selection of individual stocks, not the creation of an interacting portfolio of securities (something which has been left to the funds).

Costs

The costs for an individual or smaller investor, or an investor seeking to invest a smaller amount, in attempting to create and maintain a diversified portfolio stem, in part, from the cost of brokerage. An investor buys or sells individual securities by employing a broker. The broker purchases the selected securities for the investor directly or from a dealer or on an exchange. The costs to a retail investor of purchasing or selling a security are reflected in charges that fall generally into two categories. (For larger institutional orders, these two costs generally are far lower on a percentage basis relative to the investment as compared to a smaller order, but there are significant, additional other costs to these larger orders stemming, for example, from the market impact of the order itself in other words the ability of the existence of a very large buy or sell order to affect the price at which the order will be effected by moving the applicable bid-ask quotes. Other systems (the OptiMark™ trading system, ITG-Posit, noted below) have attempted to address this problem for these large institutional investors.)

The first set of costs are those charged directly to the investor in the form of the broker's trading commission and fees. The second are charges levied upon the transaction itself (in terms of a "mark up" or "spread") between the cost at which the security was acquired by the dealer or the exchange specialist from another investor and the cost of the security as it is sold to the investor. This is a cost that frequently is "hidden" from investors: Investors do not always realize that there is, frequently, a spread even when they are being charged a commission. But it can be a significant cost—even exceeding by multiples the explicit commission charges.

Through technology, increased efficiencies and productivity, competition, etc., these costs have been decreasing over time. Nevertheless, all in all costs (including the mark-up or spread) are still on the order (for the deepest discount broker and for the smallest round-lot of 100 shares) of at least tens of dollars per security traded. This is true even where the explicit commissions have been reduced, in some cases to zero, because the broker-dealer is extracting a high "spread" from the investor that the investor usually is not aware of. Moreover, the current view is that the costs have reached a price floor, and without new systems for engaging in trading, such as the present invention, the costs will not be reduced much further.

To create and maintain a diversified portfolio of individual stocks, an investor would have to purchase at least twenty to fifty stocks, and be in a position to add to that securities portfolio on a proportionate basis as new dollars are received to make additional investments, and to re-balance the portfolio periodically as the markets and the securities change. In other words, an investor would first have to create a diversified portfolio by purchasing say fifty stocks, and then continue to purchase stocks in appropriate proportions with any additional amounts sought to be invested on, say, a monthly basis, and also re-balance the portfolio periodically. Obviously, the basic brokerage costs—even employing the deepest discounted brokerage services—would be prohibitive for the ordinary investor. For example, to create and maintain a diversified portfolio, an investor seeking to invest $2,000 per month (a relatively high amount for the ordinary investor), would likely incur minimum all-in transaction costs for an initial fifty stock purchase of at least (and this would be optimistic) $500—or fully 25% of the initial invested amount. Such charges are obviously prohibitive.

The best that an investor can do with $2,000 per month to invest who does not wish to invest in a fund or a derivative product would be to try to build such a portfolio for lower costs by buying one or two separate stocks each month and thereby, over a number of years, create a diversified portfolio. Such a strategy has a number of drawbacks as well as taking years to implement. An investor could also add to an already diversified portfolio for a lower cost by making subsequent monthly purchases of just one or two stocks. The drawbacks in terms of lack of flexibility, inability to modify the portfolio, etc.—all similar to the problems with a locked-in portfolio stemming from a mutual fund investment—exist with this strategy as well. Only with investments approaching $10,000 per month—a prohibitive level for most investors—could these costs even begin to be viewed as non-prohibitive on a recurring basis. Furthermore, smaller investors with limited funds to invest are biased, as a practical matter, towards stocks whose value are low, i.e., $10-20 per share (which for a round lot would be $1,000-2,000) as opposed to $100-200 per share (which for a round lot would be $10,000-20,000), thereby limiting the possible selection of stocks.

As a practical matter then, brokerage costs and constraints eliminate the possibility that the ordinary investor can create and maintain a diversified portfolio on his own—as opposed to through a fund, even were the investor to have the tools and skill to be able to do so.

Capability

In addition to prohibitive costs, ordinary investors possess neither the skills nor the tools necessary to create and maintain a diversified portfolio with desired risk-return characteristics. To create such a portfolio, an investor needs to understand risk as it is defined from the perspective of portfolio theory, and have the data and the mechanism for analyzing the data to employ the theory. That data then needs to be correctly employed in connection with a trading system to allow for the cost effective creation and maintenance of the portfolio. There is no brokerage (or other system) that deploys, uses and otherwise acts upon the necessary diversification information, combined with a trading system, so as to be accessible by an ordinary investor. There are, and have been a variety of systems (for example, Schwab One Source (www.schwab.com), Financial Engines (www.financialengines.com) and a new Microsoft site (http://beta.investor.com)) that provide advice to investors as to the creation of a portfolio of mutual funds based on, among other things, risk, style, performance, and ratings. These systems, however, are not designed to enable investors to purchase a portfolio of specific securities (as opposed to assisting in the purchase of a few, specific mutual funds, with all the attendant disadvantages of holding mutual funds) in a cost effective manner, or hold fractional shares in securities (as opposed to interests in funds), or obtain any of the other advantages stemming from the ability to invest directly in securities as opposed to funds, all as mentioned above and discussed further below.

2. Inability to Purchase Small and Fractional Share Interests.

It is possible to acquire small and fractional interests through specific dividend reinvestment plans direct from certain issuers. These plans, however, are run by selected issuers and have a number of significant limitations, including, for example, average pricing usually over the course of weeks or a month.

Purchasing or selling a security through an ordinary brokerage requires transactions to be effected in minimum units of whole numbers. In other words, an investor can purchase no less than 1 share of IBM or sell no less than 1 share of General Motors, and purchases or sales must be whole numbers such as 27 shares, as opposed to 27.437 shares. In addition, costs are frequently prohibitive for small transactions in a security (such as 1 or 2 shares) or even for transactions in less than a round lot (100 shares). An investor buying a round lot in the ordinary security trading between $20 and $40 would be buying at least $2,000 to $4,000 worth of the security. Buying 50 round lots to create a diversified portfolio requires a greater investment ($100,000 to $200,000) than most investors are able to make. As a specific example, then, an investor wishing to invest $150 per week could, through an ordinary brokerage, at best buy 7 shares of a $20 stock, or 3 shares of a $40 stock, invest the balance in cash, and wait for the next week to buy a different stock or more of the same stock. But at a brokerage cost of, say, just $5 per security traded, the brokerage costs would range from $15 to $35 (a prohibitive 10% to over 23% of the amount to be invested). This is not a practical alternative. The only alternative that has been reasonable to date for an investor in this position has been to invest in a fund.

3. Inability to Select Individual Securities Reflecting Preferences to be Included Within a Diversified Portfolio.

Using a broker, an individual or smaller investor, or a person investing a smaller amount, obviously can select individual securities for purchase and sale. Ordinary brokerage, however, does not provide a mechanism for readjusting an entire portfolio of holdings as a unified portfolio of investments. Consequently, most investors are likely to be overweighted in a particular security or sector because of the costs of re-configuring their portfolio and an inability to determine the overall profile of the portfolio. Even if the overall risk and other profile characteristics are determined, the investor would usually not be in a position to act to make the portfolio diversified because of the cost issue described above.

Moreover, ordinary brokerage frequently does not provide assistance to an investor regarding other factors related to a company, such as social, moral or political considerations that would affect the investor's choice of whether to buy or sell the company's stock.

4. Inability to Obtain Superior Trade Executions.

Brokers generally execute trades when received, thereby providing "immediate" executions. There are exceptions, however. For example, a trade can be a "limit" order meaning that it can be executed only at a specific price or better. Limit orders are generally executed immediately whenever the price reaches the limit. Trades can also be set for execution at the "open" or "close," meaning the trade will be executed as part of the opening or closing call auction procedures, or upon the satisfaction of certain other conditions or at certain other times as the customer may specify.

As a general matter, under applicable regulatory requirements, customers are required to receive what is called "best execution." But that execution may not be the best price they could have received if the execution system were different. There is frequently a trade-off between price and liquidity. If a customer seeks immediate execution, then the price may be somewhat less advantageous to the customer than if the customer is willing to wait. In addition, if the customer is willing to delay the attempt to execute the order until there are multiple other orders, then the customer could again obtain a better execution because there will be a greater concentration of order flow against which to try to match the order. A number of specialized brokers (and other trading systems) currently permit institutions to hold order flow and try to match the held orders at various times. In addition, many brokers send order flow to others, such as market makers or exchanges, who concentrate order flow so that purchases can be better matched against sales, thereby providing price improvement or better executions than might otherwise occur.

There are trading systems that attempt to obtain improved trading performance for their customers, but these systems serve exclusively as various forms of "matching" mechanisms (although sometimes with very complicated algorithms) that seek to match buy and sell orders. They hold order flow over time or in accordance with specified preferences, such as the Arizona Stock Exchange, which runs periodic call auctions; ITG-Posit, which operates a crossing system that matches buy and sell orders five times a day; and the OptiMark™ trading system, which matches buy and sell orders according to various algorithms. In addition, these systems primarily, although they need not necessarily, cater to institutions and have not been made available to the individual or smaller investor (although they could be). In any event, as described more fully below, they do not provide the missing capabilities discussed above.

5. Failure to Monitor Portfolio Based Tax Effects.

Although brokers obviously could monitor the overall tax effects of a portfolio for their customers, they generally do not. The concept behind brokerage is usually the selection of individual stocks for purchase or sale, not the creation and maintenance of a diversified portfolio. Consequently, recordation of basis and monitoring gains and losses of securities—as components of a portfolio as opposed to as individual investments—would be unusual and is generally not available in most standard brokerage accounts. If a customer does obtain that advice, if it is available at all from the broker, it is usually expensive.

6. Failure to Assist in Exercise of Shareholder Rights.

Similar to the problem with tax effects, brokerage is designed to provide assistance regarding individual security transactions, not other matters. Consequently, investors are forwarded materials such as proxy statements without any advice or direction from the broker.

7. Failure to Limit Portfolio Characteristics.

Currently, brokerage is permitted in some self-directed retirement accounts established by employers (such as 401 (k)s), but not permitted in many. The reason, in part, is that employers are concerned that employees, especially somewhat less sophisticated employees, will not fully appreciate the risks of investing and may invest in too risky a security, or not a sufficiently diversified portfolio, and therefore potentially lose much or all of their expected retirement. Consequently, employers limit the choices that employees may select by offering them a limited number of investment choices, which because employers want to provide diversification within each investment vehicle so offered has generally meant, almost exclusively, various types of funds. Brokerage has not been offered because there was no way to ensure that an employee would invest in a diversified portfolio with specified maximum risk levels (hence the practice of forcing employees to invest in selected funds).

Previously Existing Systems

Electronic trading systems are known. The OptiMark™ trading system is a system that allows large institutional investors and others who are concerned about potentially moving the market by placing large orders to place such orders with minimized market impact. It is premised on the concept of a trader having a utility preference function for a particular transaction. As an example, the OptiMark™ system works by having a trader specify how much above the current equilibrium price he is willing to pay to purchase a block of securities. The system then attempts to match that trader's transaction preferences with another trader's preferences in order to complete a trade. The OptiMark™ trading system therefore engages in price discovery.

ITG-Posit is an electronic equity-matching system that lets investors find the other side of a trade during the market day. Posit utilizes mid-point pricing. Buy and sell orders, including individual stocks and portfolios, are entered into the system; five times daily, Posit processes and compares the orders. Posit trades are then priced at the midpoint of the bid/offer spread (the difference between the best seller's asking price and the best buyer's bid) in the stock's primary market when the match is run. Those orders which match are executed. Investors can keep unmatched orders in the system for future matches or can electronically route the order to any one of the primary or regional exchanges, to OTC market makers, or complete the order on an agency basis. Posit is used by major institutions and broker/dealers. Posit, like the OptiMark™ trading system, is in essence a matching system but Posit matches trades at the mid-point (as determined by a third party system) without independent price discovery. It is premised on traders wishing to trade with each other and provides such traders a potentially better execution (because of the mid-point cross) with lower market impact (because of the anonymity of the trades and the increased available liquidity based on the concentration of trades within certain time frames).

The New York Stock Exchange and the NASDAQ market also both aggregate order flow at the open and the close of the exchanges to match order flow and, of course, concentrate order flow during the day by limiting the number of persons who can trade a security (one specialist per stock on the New York Stock Exchange so that order flow at the Exchange in a particular stock moves through that one specialist, and to "market makers" on the NASDAQ, so that all order flow on the NASDAQ is focussed on the market-makers).

Schwab, Financial Engines (and perhaps Microsoft) provide services that assist investors (such as a participant in a 401(k) plan) in selecting a mutual fund or creating a portfolio of mutual funds by selecting from among a group of mutual funds available to the participant based on risk/return and other factor analysis. Once the analysis is complete, the participant then selects mutual funds for his portfolio according to what is permitted by his participation rules (if it is a 401(k) plan) or through brokers or others offering the funds. Although for Financial Engines and Microsoft there currently is no direct mechanism for actually executing the desired purchases of fund interests, Schwab does make available the ability to purchase interests in the funds directly through Schwab. There is no mechanism, however, for enabling the participant to select, craft, modify and execute a portfolio comprising individual equities: Such an investment in equities is a completely different form of investment from an investment in funds where, before the present invention, it has not been possible for a smaller investor to acquire or trade individual equities in small or fractional amounts on a cost-effective basis or to manage individual equities as an integrated portfolio as opposed to a series of individual investments.

Portfolio (or cash) management accounts and similar vehicles exist and are offered by a number of brokerages. They are somewhat mislabeled, however, in that they do not manage portfolios of securities, but simply combine in one reporting statement information regarding various types of assets held by a customer (funds, stocks, bonds, cash, etc.) and consolidate broker relationships. These accounts primarily involve linking of various types of services including credit card, loan, checking/savings, brokerage and mutual fund holdings.

Programs and databases exist that provide raw information regarding volatility and other indicia relative to individual stocks and mechanisms for investors to screen stocks to obtain a list of those stocks that meet certain profiles or parameters.

Systems exist that allow a user to screen the portfolios of certain other parties, primarily certain investment managers that file documents with the Securities and Exchange Commission. These systems do not create mechanisms for investors of a system to screen characteristics of other investors of the system (such as patent lawyers or individuals making more than $75,000) to obtain a composite portfolio or a portfolio comprising composite characteristics of these other investors.

Systems exist that are designed to create derivatives and futures that permit investors to obtain the market risk economic benefits of a portfolio investment similar to that of the current invention. These systems, however, are not currently permitted in the United States for regulatory reasons, introduce credit risk related to the issuer of the derivative/future, provide for different and adverse tax consequences compared to those offered by using the current invention, do not provide for the exercise of shareholder rights, do not permit the selection of particular stocks reflecting non-economic preferences (such as "no-tobacco"), and generally do not substitute at all for the current invention.

Some mutual fund complexes have made available to their customers the ability to screen mutual funds and determine which fund best fits certain parameters that they make available that a customer would like satisfied—and then lets the customer invest in that mutual fund. For the investor, this system again suffers from all the disadvantages of investing in mutual funds—as opposed to the underlying securities—as described above.

Some systems, like Financial Engines, provide tools for investors to select a number of mutual funds to satisfy certain investment goals. These systems do not provide tools to select a portfolio of individual stocks that, as a portfolio, would satisfy certain investment goals. Moreover, the systems that exist that review mutual funds do not review or analyze mutual funds in combination with individual securities, which is more likely reflective of the actual overall investments held by a smaller investor.

The present invention is therefore directed to the problem of developing a method and apparatus for enabling an individual or smaller investor, or an investor investing a smaller amount, to create and manage, on a cost-effective basis, a complex portfolio of securities.

SUMMARY OF THE INVENTION

The present invention solves the problem of individual or smaller investors (which includes investors investing a smaller amount and collectively referred to herein as "investors"), creating and managing on a cost-effective basis a complex portfolio of securities. The present invention does this by providing a computer-based system to which the investor provides his preferences, which system generates a portfolio that reflects the investor's preferences or assists the investor in selecting a portfolio, allows that portfolio to be modified by the investor as a whole portfolio and allows the investor to direct that the portfolio or specified individual securities in the portfolio be purchased or sold or modified as a portfolio transaction. The system further aggregates orders generated by other investors at various times during the day for execution, and includes a device for such execution with investors being allocated specific interests, including small numbers of (and fractional shares, if needed in) securities. The system further nets the various transactions so aggregated to provide even better execution and even lower costs.

According to one aspect of the present invention, a system for enabling multiple individual or smaller investors to create, manage and trade a portfolio of assets/liabilities includes a processor and a storage device. The processor communicates with the investors via multiple communication links, and receives investor identification information and preferences and trading data from each of the investors. The processor aggregates all buy or sell orders and all otherwise economically unviable buy and sell orders for each asset/liability in the trading data from each of the investors to obtain a single economically viable buy order and a single economically viable sell order for each asset/liability. (As used herein, economically unviable orders include fractional shares, odd lots, and small amounts of shares that cannot be normally traded, or cannot be normally traded on a cost-effective basis.) The processor then transmits the single economically viable buy order and the single economically viable sell order to a third party for execution. The storage device is coupled to the processor and stores the trading data from each of the investors.

In addition, the processor creates a percentage allocation of investment classes for each investor based on allocation model input from each investor and transmits a resulting percentage allocation of investment classes to each investor. Furthermore, the processor interacts with each investor to determine an investor portfolio that corresponds to the percentage allocation of investment classes for the investor. The processor includes in determining its allocations any investments currently held by the investor, including investments in mutual funds or other funds as well as already owned individual securities, and includes these investments for the purposes of determining the overall portfolio characteristics of the investor's investments.

One particularly advantageous embodiment of the above system includes an electronic payment mechanism coupled to the processor and for coupling to a third party electronic payment system. The electronic payment mechanism transmits a request for an electronic payment for each of the investors to the third party payment system, and receives, in response to the request, electronic payment data for each of the investors electronically from the third party payment system. In addition, the electronic payment mechanism maintains multiple payment accounts, one for each of the investors. Furthermore, the electronic payment mechanism only permits trading of the assets/liabilities for a particular investor if the particular investor's payment account contains a predetermined amount. Moreover, the storage is coupled to the electronic payment mechanism and stores the electronic payment data for each of the investors, and the payment accounts for the investors.

Further, the system of the present invention can include a second communication link to a third party trading system via which the processor transmits the single buy order and the single sell order for each of the assets/liabilities.

In addition, the system of the present invention optionally includes an investor program executing on an investor's personal computer, which program prompts the investor for investor identification information and investor preferences, transmits investor identification and investor preferences to the processor, and enables the investor to interact with the processor to select multiple assets/liabilities to create an investor portfolio commensurate with the percentage allocation of investment assets. The investor program can include a graphical investor interface displaying a risk and a differential return of the entire investor portfolio relative to standard industry measurements to the investor and on absolute scales. Also, the investor program enables the investor to adjust the percentage allocation of investment assets and the investor portfolio. Moreover, the investor program communicates to the processor as trading data via one of the communication links investor identification information along with any trades of assets/liabilities to be executed to create or modify an investor's portfolio to ensure an investor's actual portfolio matches an investor's desired portfolio.

According to one aspect of the present invention, the system stores the investor program in the storage facility and upon request by a new investor transmits the program to the investor.

According to another aspect of the present invention, the electronic payment mechanism electronically requests periodic payments from the third party payment system for each of the investors. One possibility is that the periodic payment is a monthly payment or a weekly payment.

According to another aspect of the present invention, unlike all traditional brokerages that charge a commission or a fee based on a per transaction basis, or that receive their compensation (including items like payment for order flow) on a per share or per trade basis because they make their money from investors trading, the investor under the present invention can be charged a flat periodic fee (such as a monthly or annual fee as might be charged by certain financial planners) or an asset based fee comprised of a certain amount of the assets held in the system (such as are usually charged by mutual funds), or a combination of such periodic and asset based fees, or a combination of such fees and a transaction based fee.

According to yet another aspect of the present invention, the trading data can include fractional shares of the assets/liabilities desired to be traded.

According to yet another aspect of the present invention, the investor program maintains tax basis information, including date of acquisition, for all of the assets/liabilities traded by the investor. The investor program can also provide information to the investor regarding voting rights of the assets/liabilities held by the investor.

According to one aspect of the present invention, the processor receives actual trading pricing information regarding the single buy order and the single sell order for each of the assets/liabilities from the third party trading system. The processor then transmits the actual trading pricing information regarding each asset/liability traded by a particular investor to the particular investor. In response to the actual trading pricing information received by a particular investor, the investor program modifies the display of the risk and differential return of the entire investor portfolio in accordance with the actual trading pricing information regarding each asset/liability traded by the investor. Based on this information, the investor program recommends modifications to the investor portfolio to the investor via the graphical investor interface to make the investor portfolio match the percentage allocation previously determined if the investor portfolio no longer matches the percentage allocation as a result of the actual trading pricing information received from the processor.

According to another aspect of the present invention, at least one of the communication links to the investor includes a communication link to the Internet. Furthermore, the system can include a graphical investor interface displayed on a predetermined world wide web site via which a new investor can provide investor identification information to the system. In this case, the processor upon receipt of investor identification information from a new investor accesses the new investor via one of the communication links in accordance with the investor identification specified by the new investor to obtain payment information from the new investor. This communication link can include a direct dial telephone connection, a direct dial-up telephone connection initiated by the investor, a direct dial-up telephone connection to an intermediary server, which direct dial-up connection is initiated by the investor, and a network connection from the intermediary server to the processor initiated by the intermediary server, a first direct dial-up telephone connection to an intermediary server, which first direct dial-up connection is initiated by the investor, and a second direct dial-up connection to the processor, which said second direct dial-up connection is initiated by the intermediary server.

According to another aspect of the present invention, a personal computer based program for executing on an investor's personal computer, for enabling an investor to create, manage and trade a portfolio of assets/liabilities and for interfacing with a system for managing a plurality of such investors via a first communication link over which the investor transmits to the system trading data regarding trades of at least one asset/liability that the investor desires to make, includes the following elements. A graphical investor interface prompts the investor for investor identification information, and investor preference data. An asset allocation modeling process creates a percentage allocation of assets for the investor based on the investor preference data, wherein the graphical investor interface displays via the computer display multiple assets/liabilities among which the investor can select to create an investor portfolio commensurate with the percentage allocation of assets. A risk and differential return calculation process calculates a risk and a differential return of the entire investor portfolio relative to standard industry measurements or absolute values, and provides the relative risk and differential return to the graphical investor interface, which displays the relative risk and differential return to the investor. A portfolio editor process enables the investor to adjust the investor portfolio. A communication process communicates the investor identification information along with any trades of assets/liabilities to be executed to create or modify an investor's portfolio to ensure an investor's actual portfolio matches an investor's desired portfolio to the system as said trading data via the first communication link. In this program, the graphical investor interface can display the relative risk and differential return as a color code, a numerical indicator, an arrow on a dial, or an arrow on a range of numerical values or an arrow on a horizontal or vertical scale.

According to another aspect of the present invention, the system permits the investor to adjust the color code, the numerical indicator, the arrow on a dial, or the arrow on a range of numerical values or the arrow on a horizontal or vertical scale, by moving a slide or other indicator on the graphical investor interface, and by so doing change the requested risk and return levels for the investor's preferred portfolio. Consequently, the investor can adjust the characteristics of the portfolio directly by changing the position of the indicator, and the system will then store the changed requested characteristics and select securities for inclusion or exclusion in or from the portfolio, or the weighting of such securities in the portfolio, based on matching the portfolio characteristics so selected by the investor with the portfolio characteristics of the investor's portfolio of securities. In this instance, the system will recommend or suggest to the investor the securities that should be included in the investor's portfolio that satisfy the investor's risk and return selections, combined with any other selections or preferences that the investor may have.

According to another aspect of the present invention, the system includes, in its differential risk and return calculations, securities and other investments, including funds, held by the investor that were not acquired through the system but that the investor notes or describes to the system, in determining the overall portfolio characteristics and in making recommendations or suggestions to the investor as to what other securities should be included in the investor's portfolio.

According to another aspect of the present invention, the system permits a sponsoring organization, such as an employer, to specify that all the investors in the system of that sponsoring organization (such as employees in the employer's 401(k) plan) may invest using the system, but that their portfolio must all times meet certain specifications. The specifications could include a minimum number of stocks (such as 30), a maximum concentration in any particular stock (such as 5%) and a maximum risk level (such as no more than 10% more risky than the market as defined by the S&P 500 risk level). Similarly, the head of a household could establish investing accounts for members of the household with similar constraints or whatever other limitations along similar lines were desired.

According to another aspect of the present invention, the program includes a configuration control process that provides a version number of the program to the system in response to a request from the system, wherein the system downloads an updated version of the investor program upon detection of an out of date version.

According to another aspect of the present invention, a method for creating and managing a portfolio of assets or liabilities by performing a plurality of transactions, includes the steps of: a) obtaining investor preferences for portfolio characteristics of an investor; b) employing the portfolio characteristics to describe and select assets or liabilities to be transacted in multiple transactions by an investor; and c) aggregating the transactions of a single investor with the transactions of other investors over an applicable characteristic of the assets or liabilities. In this case, the transactions can be aggregated over a time, such as every three hours, once per day, or multiple times per day at predetermined times. Once the transactions are aggregated, they are then executed.

According to another aspect of the present invention, the method can include the step of netting the transactions against the transactions of other investors after aggregating the transactions, and then executing any remaining transactions after netting.

According to yet another aspect of the present invention, an apparatus for enabling a plurality of investors to make periodic investments in a portfolio of securities includes a processor and a storage device. The processor receives data from each of the investors regarding amounts of money to be invested in each investor's portfolio, and accesses an electronic payment system upon receiving instructions from an investor to purchase securities to obtain payment for the required purchases. The storage unit stores each investor's portfolio. This apparatus can optionally include a third party trading system interface device that aggregates all investors' trades and sends the aggregated trades as a single trade in each security to a third party trading system, which orders can optionally be netted before sending them to the third party trading system.

The present invention also permits the collection of securities into pre-packaged portfolios that, if acquired by an investor, provide the investor all the advantages described before of directly owning the underlying securities while having a portfolio that reflects some strategy or preference determined by some other means. For example, a currently popular strategy is to invest in the ten of the thirty stocks comprising the Dow Jones Industrial Index that have performed the most poorly in the past calendar year. The expectation is that these ten stocks will then outperform the index in the succeeding calendar year. Consequently, currently, investors wishing to follow this strategy generally purchase an interest in a unit investment trust. Each year the trust liquidates and an investor wishing to continue the strategy must purchase a new interest in a new trust in the next year. These trusts normally carry maintenance fees and are sold by brokers who charge a significant load for acquiring the trust unit. Moreover, the unit is dictated by the sponsor. If an investor wanted to buy the nine, instead of ten, stocks that most under performed, there is currently no good mechanism for doing so. In addition, the investor owns an interest in the trust, which has many of the same negative characteristics as a fund, described above. Therefore, according to yet another aspect of the current invention, the investor could simply click on a button on the graphical investor interface and receive a proposed portfolio consisting of a selected grouping of securities like the ten under performing stocks in the Dow Index. The investor could then keep that portfolio as suggested, or modify that portfolio if desired by eliminating one of the stocks (to create the nine aforementioned) or by adding another to create eleven, or by modifying the relative weightings of the ten etc. The portfolio would then be acquired for the investor just as if the investor selected the securities to be included in that portfolio through other means. In addition, the portfolio that is pre-packaged as a starting point for the investor could also be a portfolio recommended by another, such as an investing magazine's picks for the next few years, or an analyst or investment bank's selections, or an organization's preferences (such as the AFL-CIO's or the Business RoundTable's preferences or members), or even a famous person's selections. In each case the investor obtains the benefits of the system providing a portfolio of directly owned securities, as opposed to an interest in a fund or trust.

The present invention also provides for the collection of information concerning the plurality of investors of the system of the present invention. Investor characteristics are collected and stored on an anonymous basis so that subsequent access to information derived from investor statistics and demographics can not be traced to any one particular investor. This data collection capability leads to a variety of novel investment strategies. For example, information might be collected from a number of patent lawyers or economists. An investor of the system might then be able to pose a question concerning a particular affinity group, for example patent attorneys or economists. The investor might then be interested in what securities are being invested in by patent lawyers or economists.

Once an affinity group is identified, the system can gather statistics for the investor noting, again hypothetically, that as a group, patent attorneys invest in high technology stocks. The system could then list the ten most frequently traded high technology stocks in which patent attorneys are interested. Similarly, the system can gather statistics for the investor on what level of risk and return generally characterizes the current portfolio investing by economists, and then create a portfolio that matches those portfolio characteristics.

If an investor has a particular interest in a more specific affinity group, the investor might query the system of the present invention to provide all of the securities in which patent attorneys who specialize in mechanical engineering are investing. Again general groupings of securities could be presented or the top ten securities being traded by mechanical patent attorneys can be listed, or the portfolio characteristics can be selected and matched.

Since a wide variety of information can be obtained by the system of the present invention, various multivariate analyses can be performed so that a wide variety of affinities can be created. For example, a generalized profile can be created for all those investors who earn more than $75,000.00 per year. Alternatively, all those investors who have an engineering background in electrical engineering, regardless of their actual profession, can be created. A securities listing for all actors who live in California could also be created.

Once these affinity group investment characteristics and strategies are created, an investor can have the option of investing in the same portfolio (based on risk/return characteristics, identity of security characteristics, such as high tech, or individual securities or otherwise) as is listed for a particular affinity group. Thus affinity group investing can be supported by the system of the present invention. This again provides numerous options for unsophisticated investors, or those investors who simply wish to take advantage of the thought processes of a particular group of investors whose characteristics are selected by the investor.

An additional functionality of the present invention is to assess the relative performance of the portfolio of each affinity group. Since the securities either as groups (e.g., utilities) or individual stocks (e.g., Intel) can be analyzed over various periods of time based upon information stored in the securities database of the present invention such information can be provided to the investor. In this manner an investor might determine that Hollywood actors are better investors than patent attorneys.

An additional benefit of the present invention is that it allows for an investor to modify the investor's portfolio without selling all the securities held by the investor, but rather by simply modifying the portfolio. Consequently, as compared to an investment in funds where an investor may wish to switch from a Fidelity fund to a somewhat more risky Vanguard fund, where the investor currently has to sell the Fidelity fund (with possible tax consequences) to buy the Vanguard fund, under the present invention, the investor merely has to increase the risk level. According to one aspect of the present invention then, an investor that wishes to match the risk level (within possible limits) of a specified fund merely modifies the risk level of the given portfolio to do so. This can be accomplished by leveraging (margining) the current securities positions without having to sell any of the securities.

According to yet another aspect of the present invention, in order to permit the investor to understand and manage its portfolio on a whole, integrated basis, the investor would be permitted, for purpose of analyses, to aggregate the holdings in multiple accounts (such as an IRA, a 401(k), and a non-tax-advantaged account that the investor uses for investing). In this manner, the investor can view all its holdings in securities and other investments as a single integrated investment portfolio for purposes of determining risk levels, diversification, concentration, sector exposure, or otherwise. Consequently, the investor obtains the benefits of viewing its portfolio as an integrated whole, as opposed to a series of unconnected investments, even though for legal purposes the accounts are maintained as legally disparate and separate accounts. According to yet another aspect of the present invention, the same concepts of aggregating across legally disparate accounts could be employed in connection with other securities, primarily interests in funds, and even investments other than individual securities or funds, such as real estate, gold or other investments, that an investor might hold.

In addition, individuals who wish to invest in securities, or who should invest in securities in order to achieve their financial goals, frequently are not sufficiently sophisticated enough to be familiar with the wide variety of technical terms and their meanings associated with such investing. For example the term "volatility" may have little meaning to a novice investor. Further, such an investor might have specific desires for stocks which might be expressed in terms of a desire to invest in "big companies" or "high tech" stocks yet the investor may not have a firm foundation for what these terms actually mean. In order to assist novice investors in taking advantage of the wide variety of capabilities of the present invention, a natural language interface is provided wherein an investor can pose investment preferences in terms with which the investor is comfortable. The natural language interface parses the input language of the investor into securities characteristics that would meet the investor's needs. For example, if the investor desires to invest only in "big companies," the natural language interface translates that desire into a query against annual revenues of companies in the securities database. Further, the term, "big companies" could then be determined to mean companies whose annual gross revenue is in excess of $1 billion, for example. This in turn implicates only certain stocks in the generalized portfolio of securities in the system's database. Therefore, as a result of the investor's desire to invest in "big companies" a series of stocks would be selected and displayed to the investor which fits into the characteristics desired by the investor.

This natural language interface can be accomplished in several fashions. For example, keyboard queries now exist in most software packages whereby an investor can pose a question in a natural language which is then interpreted by a natural language interface to retrieve topic suggestions. Additionally, speech processing is now at a point where voice input can be used as direct input to a natural language interface. In this fashion, investors who wish to speak their requests, or individuals who are handicapped and have difficulty using a keyboard, can use a speech processor connected to the natural language interface of the present invention to input their requests for stocks of a particular type.

For those investors who generally want to invest but are totally unfamiliar with the terminology that characterizes stocks, a series of screens may be presented to the investor which gives the investor options in a natural language form which the investor can then select as input to the system for the selection of securities. For example, a screen may provide the investor with choices which state "I wish to invest in large companies." In this example, checking of this particular characteristic on a screen results in a series of securities characteristics being triggered in a query against the generalized database of securities. In this case a natural language processor is not necessarily required since the "canned" queries can already have the rules for securities selection associated with the choice on the screen.

Thus in this fashion investing in securities is simplified for those investors who are new to investing or who simply lack the vocabulary to specify the securities such investors' desire.

BRIEF DESCRIPTION OF THE DRAWINGS

FIG. 2 depicts a sample investor input questionnaire for use in an asset allocation model.

FIG. 3 depicts a sample output of an asset allocation model.

FIG. 4(A) depicts a sample portfolio editor screen according to the present invention and FIG. 4(B) depicts a sample portfolio selection screen with other portfolio starting points.

FIG. 5 depicts a sample output of the portfolio selection process of the present invention.

FIG. 6 depicts an overall block diagram of the computer-based system of the present invention.

FIGS. 9-12 depict a flow chart of the processing occurring at a Web server in connection with creating or modifying a small sample portfolio according to the computer-based system of the present invention.

DETAILED DESCRIPTION

Figure 1:
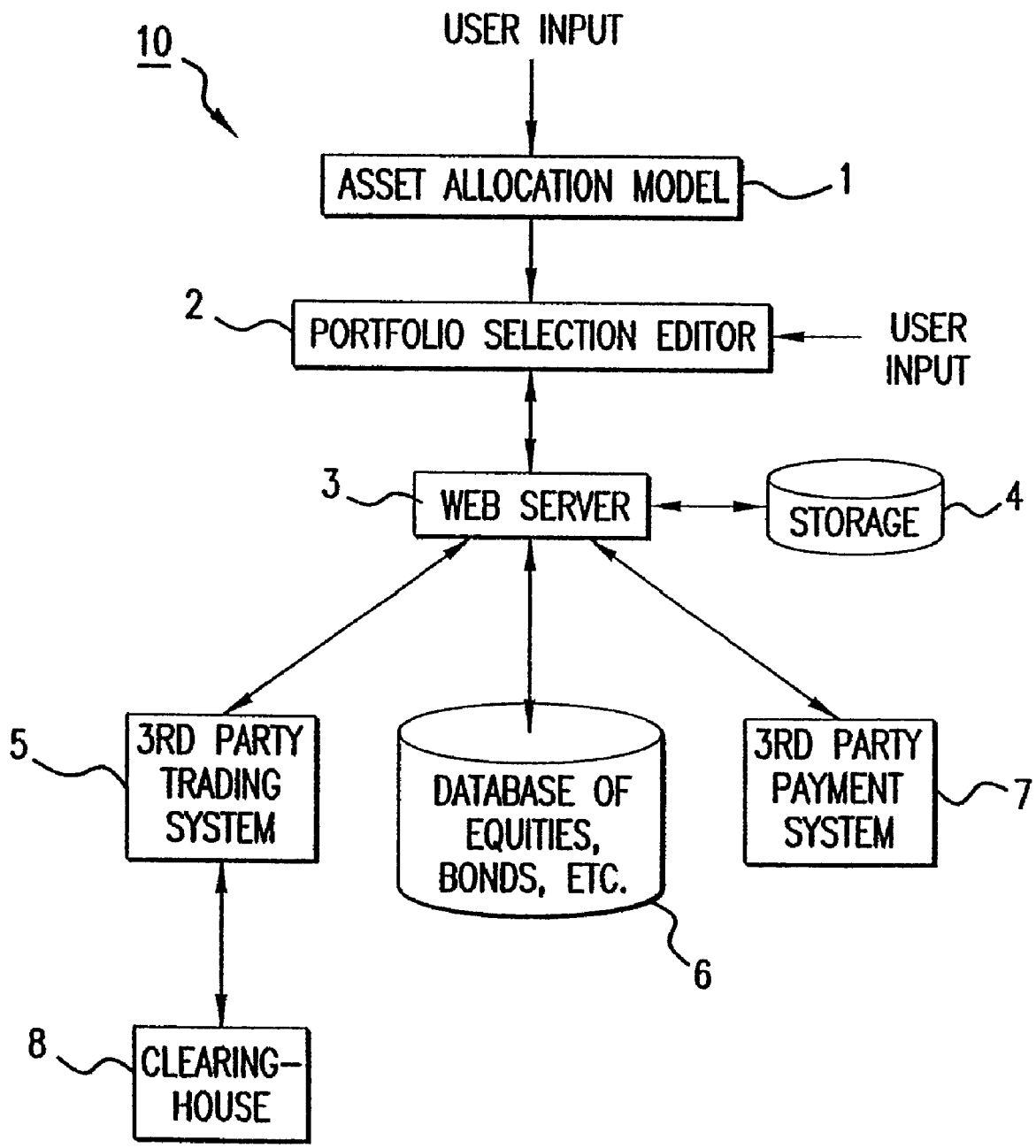
FIG. 1 depicts the process according to the present invention in block diagram format.

As used herein, assets, rights or liabilities refers to any tradeable commodity or item of value in which there exists a market for trading. This definition includes securities, equities, derivatives, currencies, fungible commodities, insurance contracts, mortgages, bonds, airline reservations, hotel reservations, golf tee times, country club memberships, antiques, etc. Although the computer-based system of the present invention can be used with regard to any asset or liability that is traded, the discussion herein relates primarily to its use in connection with securities for simplicity purposes.

As used herein, smaller investors includes generally any investor investing a smaller amount, regardless of whether an investor is an institution or an individual, and regardless of whether the investor is acting on its own behalf or on behalf of another. It would also include an investor investing through a financial planner, for example, who actually provides the inputs for and access to the system on behalf of the investor. The present invention consists of a computer-based system that provides smaller investors, a convenient and simple mechanism for investing small amounts including on a periodic basis, and a personal computer based or accessible program for managing a portfolio of securities, including the ability to make adjustments to the portfolio by selling or purchasing securities to modify the portfolio, for monitoring tax effects, for passing through voting rights of the securities and for delegating such rights to third parties at the discretion of the investor, for limiting parameters of portfolios if desired by the investor or another with authority over the account, and for analyzing investments held by the investor on an integrated, portfolio basis.

By aggregating orders that are otherwise economically unviable, such as odd lots, fractional shares and small orders, into one large order, the present invention creates an economy of scale that permits smaller investors to create, own and manage a portfolio of securities, i.e., an individual mutual fund-type of investment that is tailored to the specific preferences of each investor. By aggregating orders into one order the present invention permits costs to be based on a small fee relative to each economically, unviable order, rather than even a small fee that would otherwise make placing the economically unviable order impractical. For example, if an individual or smaller investor can only afford to invest $100 per month, and wants to create diversification, each time the investor invests in 30 stocks, he would have to pay, say $5 for each order under existing deep discount brokerages (and that would be just the commission charge, not including the all-in-costs from wide spreads, etc.). Obviously, no one would pay $150 to invest $100. In contrast, the present invention permits the small investor to invest his $100 per month because the entire order being placed by the system incurs one fee that is then distributed across the orders pro rata, hence a small order only incurs a small fee. For example, if the entire fee was 2% of the order, then the investor would owe $2 for his $100 investment.

The structure of the system of the present invention also allows its cost to be based on access to or usage of the system (such as a monthly fee of $5) as opposed to according to securities orders entered into the system, as per common brokerage. The result is that the investor can cost-effectively create a portfolio of securities comprised of directly owned individual securities with attributes similar to a mutual fund, such as diversification, but with advantages, such as tax advantages, over a mutual fund.

The underlying purpose and principal theme embodied in the computer-based system of the present invention is that investors should be able to invest in tradeable assets as a portfolio instead of as a collection of individual assets. In other words, as portfolio theory teaches, the value of an asset to a portfolio is different from the value of the asset by itself; the computer-based system of the present invention, therefore, permits investors to make investment decisions based on the effect on the investor's portfolio, and to create and maintain a diversified portfolio.

The computer-based system of the present invention as compared to funds, among other things, provides:

1. Complete control for the investor over what securities can be selected, and in what weights and amounts.

2. Control over the tax effects of purchases or sales of the securities included in the portfolio, preventing the investor from being presented with unwanted taxable gain due to discretionary sales transactions of fund managers.

3. All the information necessary to monitor and manage tax effects and the capability to sell or buy the individual securities in his portfolio to obtain desired tax benefits.

4. All shareholder rights with respect to each security in the portfolio to the investor and full ownership and control over all investment, voting and other decisions regarding such securities.

5. Direct control over the charges and expenses that will be incurred.

6. The possibility of making multiple and intra-day investment decisions by the investor, if he wishes.

7. Control over all factors in the portfolio and modification of them as the investor sees fit.

Furthermore, compared to existing brokerage services, the computer-based system of the present invention:

1. (a) Reduces costs because the system aggregates order flow, limits the number of actual trades that need to be made external to the system, directs investors to specified securities to further concentrate the order flow, and automates the input process. (Consequently, the system's charges to the investors for the creation of a portfolio can be far less—on the order of one to two orders of magnitude less—as compared to even deep discount or non-discount brokers, respectively); and (b) Enables an investor to select individual securities reflecting his preferences to be included within a diversified portfolio by stepping the investor through all the issues for creating and managing a diversified portfolio and by providing the method and apparatus necessary to create and manage such a portfolio.

2. Enables an investor to acquire fractional and small numbers of shares, thereby permitting the cost-effective creation and maintenance of smaller, but diversified, portfolios. As a result, the computer-based system of the present invention permits even a very small investor to create and own a diversified portfolio of securities (or any other assets or liabilities) for any amount, even if all of the shares are fractional amounts!

The computer-based system of the present invention permits, without incurring any additional costs, investors to purchase or sell small—and even fractional—units of shares. This is because, according to one embodiment of the computer-based system of the present invention, the system aggregates orders provided by its investors, executes the aggregated transactions and then allocates the acquired (or cash for sold) shares back to the accounts of the investors. (Since transactions outside of the system must still be made in full share amounts, it is possible that a fractional share amount could remain after the allocations. For example, 7½ shares of a stock in total could be allocated to 15 different accounts—with ½ share allocated to each. To effect this transaction, if the shares are acquired from outside the system, the broker operating the system would acquire 8 shares. The remaining ½ share would be owned by the broker or a third party worker with the broker operating the system and held for allocation as needed in subsequent rounds of trading.) Consequently, an investor could have $150 per week invested in 50 stocks, receiving an allocation to his account of fractional shares. Each subsequent week, the investor would have added to his account additional fractional interests in each of these stocks. Over the course of a year with, for example, about $7,800 invested, the investor would have full and fractional shares in his account (if the average stock price were $30, the investor would have on average a little over 5 shares—5.2 shares to be precise—in each of 50 stocks). The system of the present invention permits that full investment each week (or any desired period) in a diversified portfolio, the transactions in small share interests, and the transactions in fractional interests (none of which is possible on a cost-effective basis with ordinary brokerage). According to another embodiment of the computer-based system of the present invention, the system could be maintained by a broker so that the orders of the investors are executed by the broker or a third party as principal, with the broker maintaining a position in the securities, and thereby, in essence, aggregating the orders of the investors as contra-side transactions of the broker. Periodically, the broker could then execute an offsetting trade in the market place if the broker did not wish to carry the position.

3. Enables an investor to select individual securities reflecting preferences to be included within a diversified portfolio, and provides the information and tools necessary to create this type of portfolio for a low cost. The tools can also include "pre-packaged" or "celebrity" or other selected portfolios that can be further modified by the investor, or portfolios reflecting the portfolios or portfolio characteristics of specified affinity groups or other selected investors.

4. Enables reduced transactions costs by accepting customer orders entered at any time and aggregating them for trading. The computer-based system of the present invention holds the orders (except for those for which immediate execution is desired by the customer) until particular times, such as for example, at least three times per day (the "open" for any orders received since the last close of business, "mid-day" for all orders received during the morning, and the "close" for all orders received during the afternoon). The number of times orders could be traded is in general not limited, and depends to some extent on the number of investors, and the degree of risk or principal positioning that the broker wishes to accept. The computer-based system of the present invention takes all the orders that have been entered with it and, at the specified time, aggregates those orders for the purpose of reducing the number of transactions that would have to be executed, thereby reducing transaction costs and providing benefits to investors.

5. Enables superior trade execution of orders through netting. Furthermore, the computer-based system of the present invention includes the capability of netting orders against each other. The remaining orders that cannot be matched are executed internally (to the extent the system is making a market in the securities being traded) or forwarded for execution to a third party execution system (such as an exchange or a market maker).

6. Monitors portfolio based tax effects. In contrast to the prior art, the underlying concept of the computer-based system of the present invention relates to the creation of a portfolio. In that context, the monitoring of the portfolio for tax effects is an adjunct to the transaction history and portfolio monitoring is part of the system. Consequently, the computer-based system of the present invention can track the basis and acquisition date in each of the securities in the portfolio and use that basis to determine the tax consequences for the individual securities and the portfolio as a whole at any point in time.

7. Assists in the exercise of shareholder rights. Because the computer-based system of the present invention is designed to assist with regard to portfolios, including the exercise of shareholder rights regarding the portfolio securities, the computer-based system of the present invention offers assistance to investors in the form of aggregating not only their order execution, but also their voting or other rights. Consequently, an investor can obtain information in connection with his portfolio as to how securities could be voted by a service that analyzes the securities in the portfolio. The investor is permitted to direct that the voting be delegated to such service (or other services if multiple services are made available).

8. Permits the establishment of portfolio parameters. Because the computer-based system of the present invention is designed to assist in the creation of portfolios comprised of individual securities as opposed to the acquisition of individual securities as such, the portfolios can have limits imposed on them to facilitate "informed" or "reasonable" investing as determined by a plan sponsor or other party. Such parameters can be such that the portfolio must be diversified and not too risky, for example (in other words, it must have a set minimum number of stocks, such as 30, satisfying certain criteria, with no one stock accounting for more than 5% of the portfolio's value, and the overall risk in the portfolio not being in excess of a specified amount, such as 110%, of the S&P 500 risk level).

System Overview

A block diagram of the process flow according to an exemplary embodiment of the computer-based system of the present invention is depicted in FIG. 1. The system 10 includes an asset allocation model 1, a portfolio selection editor 2, a web server 3 with storage 4, a database of tradeable assets or liabilities 6, a third party trading system 5 coupled to a clearinghouse 8, and a third party payment system 7. Information is provided by the investor to the computer-based system 10 through a graphical investor interface, which is shown in FIG. 1 in two parts as the asset allocation model 1 and the portfolio selection editor 2.

In the asset allocation model 1, an investor is first queried for answers to a series of questions that determine investor data (e.g., name, address, payment information, etc.), the investor's risk tolerance and financial goals and objectives, the investor's current assets and liabilities, the investor's current and expected income and current and expected expenditures and time frames (e.g., college education for children within 10-15 years, care of a parent within 5-10 years), the investor's preferred risk-return characteristics, the investor's preferences for various types of securities and preferred portfolio mix, and various other items. There are a variety of different outputs for the asset allocation model. One formulation is an amount that the investor should invest in long-term investments, medium-term investments, and short-term investments. The asset allocation model determines a percentage allocation in each of the general investment types according to a set of known tables. There are many existing asset allocation models, any of which can be employed in the present invention, such as that provided by Quicken™, Mentun Investment™ from The Mentum Corporation and perhaps Financial Engines (www.financialengines.com).

An exemplary questionnaire used for input to any of the above asset allocation models is depicted in FIG. 2. FIG. 3 depicts an exemplary output of such an asset allocation model.

The investor can enter the system at various stages, however, and need not answer all the questions. For example, the investor could start at the beginning, presenting all the basic information about age, income, liabilities, financial goals, etc. In that instance, the computer-based system of the present invention utilizes any of the known and publicly available asset allocation models, or a combination of such models, to provide information to the investor as to the percentage of investable assets that should be allocated, generally, to short-term liquid investments (such as a money market fund, or short-term government or investment grade bonds), medium term investments such as medium term bonds, and long-term investments (such as equities, private placements or the like).

Once this percentage allocation is generally determined, the system enables the investor, as described below, to select a portfolio of tradeable assets or liabilities. This selection involves providing among other things an indication of the historical levels of risk and returns of the tradeable assets or liabilities to the investor as a portfolio of investments.

Once the investor selects his desired portfolio based on his various preferences as to specific assets or liabilities to be included in the portfolio, that portfolio may include different historical and expected levels of return than necessary to achieve the investor's stated financial goals. Consequently, the present invention provides an indication to the investor that these selections now require a modification of either the investor's specific asset/liability preferences or the percentage allocation to reach his investment objectives. The system does this by comparing the historical and expected rates of returns of the investor's portfolio to the rates of return assumed in the asset allocation models using known probabilistic methods including value at risk and sensitivity analysis, and when determining a difference exists, suggesting an adjustment in the percentage allocation to correct for the difference so that the desired financial goals can be achieved within the constraints set by the investor. To the extent these goals cannot be achieved, the present invention informs the investor that the risk return levels are not sufficient to reach the established goals. Moreover, the system provides further information to the investor as to what returns and levels of investment would be necessary to satisfy various financial goals modified to take into account the investor's risk preferences as provided to the system.

In addition, the asset allocation model to be used utilizes probabilistic estimates of the likelihood of meeting those goals given various asset allocations. In the case where the investor steps through this series of inquiries in the asset allocation model—which, as noted, is optional—the investor is presented with an output that is then used as an input to the next stage: namely, building the specific portfolio.

One unique feature of the present invention is shown by the distinction to the normal use of an asset allocation model, even one utilizing probabilistic returns such as Financial Engines. Under the present invention, the amount to be allocated to various asset classes is informed and is dynamically adjusted by the investor's preferences—not just the investor's demographic and asset/liability/income/expenditure information. By way of example, take two investor's who are identical in every respect regarding their assets and income and expected income from their jobs, their liabilities and expected expenditures, and financial goals for retirement, etc., except for their risk tolerance and preferences. One investor is very risk adverse, the other very willing to take risks. The usual asset allocation models would prescribe identical allocations to each. Adding probabilistic determinations as to the performance of various asset classes or various assets, such as mutual funds, simply allows a finer tuning and more accurate use of the asset allocation model. In other words, it simply ensures that when the determination is made to invest in a fund that returns an equity level investment, that the fund so invested in actually is expected to provide that return. It would still generate identical results for the general asset allocation or specific asset allocation, because it uses the information as to the investor's goals—and the asset's probabilistic returns—to arrive at a model of what asset is needed to satisfy the investor's goals. It does not use the investor's own risk tolerance in a dynamic manner to adjust the asset allocation model. But if, for example, some significant allocation in equities is necessary to reach the specified financial goals, and the investor who is very risk adverse is unwilling or reluctant to invest in equities that have ordinary market risk, it will be important to adjust the allocation and the actual equity portfolio in which the investments will be made. In other words, while the non-risk adverse investor may have, as an example, one-sixth of his investable assets in money market or short-term instruments, one-third in high risk equities, and one-half in intermediate risk instruments, it may be necessary for the risk-adverse investor to, contrary to expectations, have a portfolio that has more equities—but ones with lower risk—to satisfy both his financial goals and his perception of risk. Thus, the system of the present invention provides the asset allocation model with additional risk preference information that can be acted upon precisely through specific security portfolio allocation, as opposed to the typical asset allocation model that simply provides for an allocation to "equities" or to "funds" and then finds the equities or funds that satisfy the average as determined by the model, without being able to distinguish between—or create and act on—specific portfolios of equities that will be optimal for the investor taking into account, on a dynamic basis, the actual risk preferences, as opposed to only the financial goals and related factors, of the investor.

Notwithstanding this potential benefit, an investor could completely skip that portion of the interface involved in the asset allocation determination, and move directly to creating a portfolio, such as by stating that the investor wishes to invest in equities and would like to create a portfolio based on stated preferences. In this case, the investor enters those preferences just as an investor starting with the asset allocation determination would have entered these preferences, but without seeking the allocation, or the investor can select from a number of other portfolio creating starting points, such as pre-packaged portfolios, celebrity portfolios, affinity group portfolios, or portfolios suggested or recommended by the system based on the investor's risk and return preferences as generally stated by the investor. The portfolio screens enable selection of securities based on type of business or industry, stock volatility, capitalization, inclusion in various indices, book-to-earnings ratio or other financial measures, corporate governance or other matters, etc. The other portfolio creation starting points would consist of portfolios such as various indices (or subsets of various indices that generally reflect the risk-return characteristics of the indices), various strategies, such as the ten stocks in the Dow Jones Industrial Index that underperformed during the last calendar year, or other strategies embodied in various unit investment trusts, celebrity portfolios reflecting the portfolios of famous people or analysts or others, or portfolios encompassing recommendations from investing magazines or newsletters or other sources, or portfolios reflecting screened risk-return characteristics from various affinity groups that can be created by the investor, such as the portfolio characteristics of managers with more than $200,000 income, securities lawyers living in Washington, D.C., engineers in Silicon Valley, commercial bank officers or other groups (all aggregated and with permission to protect privacy). An exemplary screen for inputting criteria for selecting the securities in the portfolio is depicted in FIGS. 4(A) and 4(B).

FIG. 5 depicts an exemplary output of the selection, in which each of the forty securities are equally weighted in the portfolio in terms of dollars invested in each security, which such exemplary portfolio could have been obtained through the investor's screening of stocks as part of the screening selection criteria based on book value, etc. pre-packaged portfolios, etc. affinity portfolios, etc. all as modified by the investor. Other variations are possible, and they can depend upon the price of the underlying security, and the total numbers of securities available, and the combined risk factor desired for the entire portfolio.

To accomplish this selection, the portfolio editor 2 accesses the web server 3, which in turn accesses the database 6 of equities, bonds, etc. This database is constantly updated with pricing, capitalization, price to earnings ratio, etc. from various stock reporting services known in the art. Each relevant factor of a security is associated with that security. When the investor establishes criteria for his portfolio, each of the relevant factors for each security in the database is compared to the criteria, and if they match the security is either included or excluded from the portfolio depending on the particular criterion.

As an example, an investor might have stated that he wished to invest solely in large capitalization, software, financial services and entertainment companies based in the United States with no negative corporate governance factors. The system then returns a listing of stocks, including obvious ones that are household names and some that are not. The system then specifies percentages of each stock to allocate to the portfolio in order to insure a reasonable level of diversification (and would alert the investor if that could not be done). One example would be dividing the total dollar amount being invested by the number of securities meeting the criteria entered by the investor and allocating an equal dollar amount or a capitalization-weighted dollar amount to each of the securities, and if there were fewer than twenty securities for example, indicating to the investor that reasonable levels of diversification were not necessarily achieved. It should be noted that other levels of diversification could be used as well.

In addition, the system specifies the level of risk for the portfolio and suggests changes to satisfy the investor's preferences. As an example, if there were insufficient companies in the above list, the system would suggest either relaxing the capitalization standard, or including more industries, such as communications, which could be viewed as similar to the non-manufacturing industries selected by the investor.

In conjunction with certain of these screens, the investor is provided with a response that shows the investor, graphically and/or with text and/or number representations, the results of the investor's selections. An exemplary portfolio is depicted in FIG. 5. The results include a comparison of the historical inherent risk in the selected portfolio relative to known standards, such as the S&P 500, and the riskiness from the perspective of lost principal, etc. of the portfolio for specified periods or through specified formulas.

The investor next specifies the dollar amount to be invested in this portfolio. The investor's order is then aggregated with the orders of other investors (or the broker becomes the aggregator by executing the order and taking a position in the stocks). To purchase the defined portfolio, the investor must have assets on hand or credit to acquire the securities, which can be obtained through any of various mechanisms, such as a direct deposit to the system, through a check or electronic funds transfer (EFT) to the broker operating the system, by arranging credit to be extended (including on a temporary basis while the order is being settled), or by having cash or other securities to be sold on hand from previous transactions, etc. Those systems that involve third parties are depicted in the figures as the third party payment system 7. One of the options offered by the system is a money market fund for excess cash, as well as a linked debit card, credit card, check writing facility to reach funds in the investor's account and other ordinary and known cash management services.

The system electronically executes the needed transaction at the next transaction window (which could be set at the discretion of the system operator (the broker or bank running the system), such as when a certain market exposure such as when $10,000 or more of a long position in a security or aggregation of securities in portfolios is reached, or at set times such as three times a day) to create the specified portfolio for the investor. This transaction is performed in two steps. First, the orders of all investors are aggregated within the system 10 (with the system operator potentially pre-aggregating some orders as principal, such as by executing against itself all orders of less than $1000 and then aggregating these orders as one larger order that it executes for itself) and then netted against each other, again within the system 10, to the extent consistent with then applicable regulations. Then, if the system is not part of a broker making a market in the securities, the excess trades are electronically sent to a third party trading system, such as the OptiMark™ trading system. If the system is part of such a broker making a market in the securities, then the broker executes the excess trades directly. This portfolio creation and execution, with aggregation in connection with the transactions (in transaction windows with or without the broker engaging in some pre-aggregation) and with or without netting, of customized orders of individual securities for smaller investors—the ability actually to effect the transaction and create and manage the portfolio of securities—allows investors to obtain advantages over ordinary brokerage and over selecting and investing in mutual funds, and over those systems that purport to monitor portfolios, either of securities or of funds.

The computer-based system of the present invention includes the capability to allocate suggested holdings to the investor to create a diversified portfolio (which likely will include fractional share interests in stocks). The portfolio created by the computer-based system of the present invention provides the investor the benefits of modern portfolio management theory and does so in the context of a system that allows for the creation and maintenance of the portfolio for a cost that is reasonable in light of the portfolio's size.

Additional funds can be added to purchase additional stocks, or amounts of existing stocks, in the portfolio, with such funds being added automatically out of direct deposits of paychecks, for example, or sales of part or all of the portfolio can be effected, numerous times a day. If the investor wishes to add or sell specified stocks, for example for tax purposes where the investor wishes to obtain a taxable loss, the system informs the investor of the effects of the change on the portfolio's diversification and risk levels, etc. But (unless there is some restriction imposed by an employer for example) the investor has complete control and can determine to create a completely non-diversified portfolio comprising only one or a few stocks, if desired, by selecting to have the system acquire, or the portfolio consist exclusively after sales of, only those stocks. Additionally, any of the preferences specified by the investor can be adjusted and made effective numerous times a day. If the investor changes his preferences, the system will review the investor's current holdings and suggest changes to reflect the new preferences, including any changes in, or to maintain, desired risk/return levels. Similarly, as the actual experience of the securities in the portfolio changes (and obviously in the case of a company, for example, that is acquired and its securities are replaced with cash), the system may suggest changes even if the investor's preferences have not changed.

The system can be accessed by the investor from a main frame or server at a distant location with the investor utilizing a direct dial-up connection or Internet access, through an intermediary such as a bank or broker, or the invention can be embodied in part on the investor's computer with the investor linking to the distant site through any of these access means to obtain specific information and provide information needed to execute trades. In other words, much of the processing can be completed "off-line" with the connection to the server being required only to obtain updated data or to send an order for a portfolio modification, or completely "on-line" depending on how much of the present invention is made resident on the investor's computer.

Overall System

FIG. 6 depicts an exemplary block diagram of the computer-based system of the present invention. It depicts an investor's computer 11a connected to a communication network 12, such as the Internet, which is then connected to a web server 14 that stores the main program for controlling trading and investor access. In this diagram, there are two other investors' computers 11b, 11c also connected to the web server 14 through the Internet 12. In addition, there is shown an investor's computer 11d connected to the web server 14 directly through a dial-up connection. Finally, there is shown an investor's computer 11e connected to the web server 14 through an intermediary 13, such as a bank or brokerage or financial planner, that is providing the system as a service for their customers, which is then connected either directly or through the Internet 12 to such web server 14.

The web server 14 is also electronically connected to other investors and traders 15 for executing trades to be made outside of the computer-based system of the present invention through any of a variety of known standard interfaces, e.g., the Financial Information eXchange (FIX) protocol. Some or almost all of the program that performs the method of the present invention can be left resident on the investor's computer 11a-11e, with the investor accessing the Server 14 to obtain updated information and to provide orders for execution.

Graphical User Interface Program Flow

Figure 7:
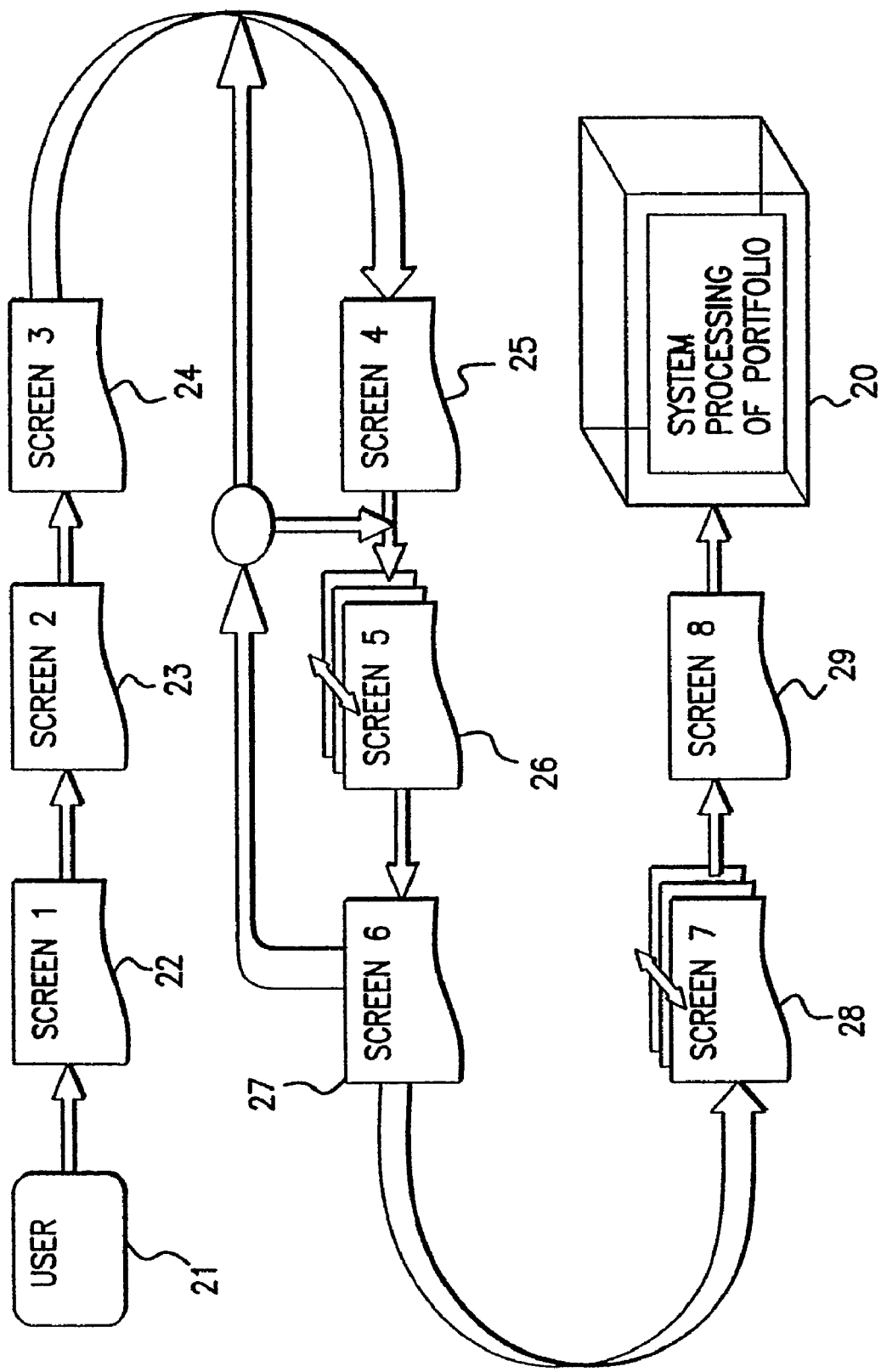
FIG. 7 depicts a flow chart of the graphical investor interface presented to the investor during the creation or modification of the portfolio according to the computer-based system of the present invention.

FIG. 7 depicts one possible flow chart of the graphical user interface presented to the investor during the creation or modification of the investor's portfolio.

Figure 17:
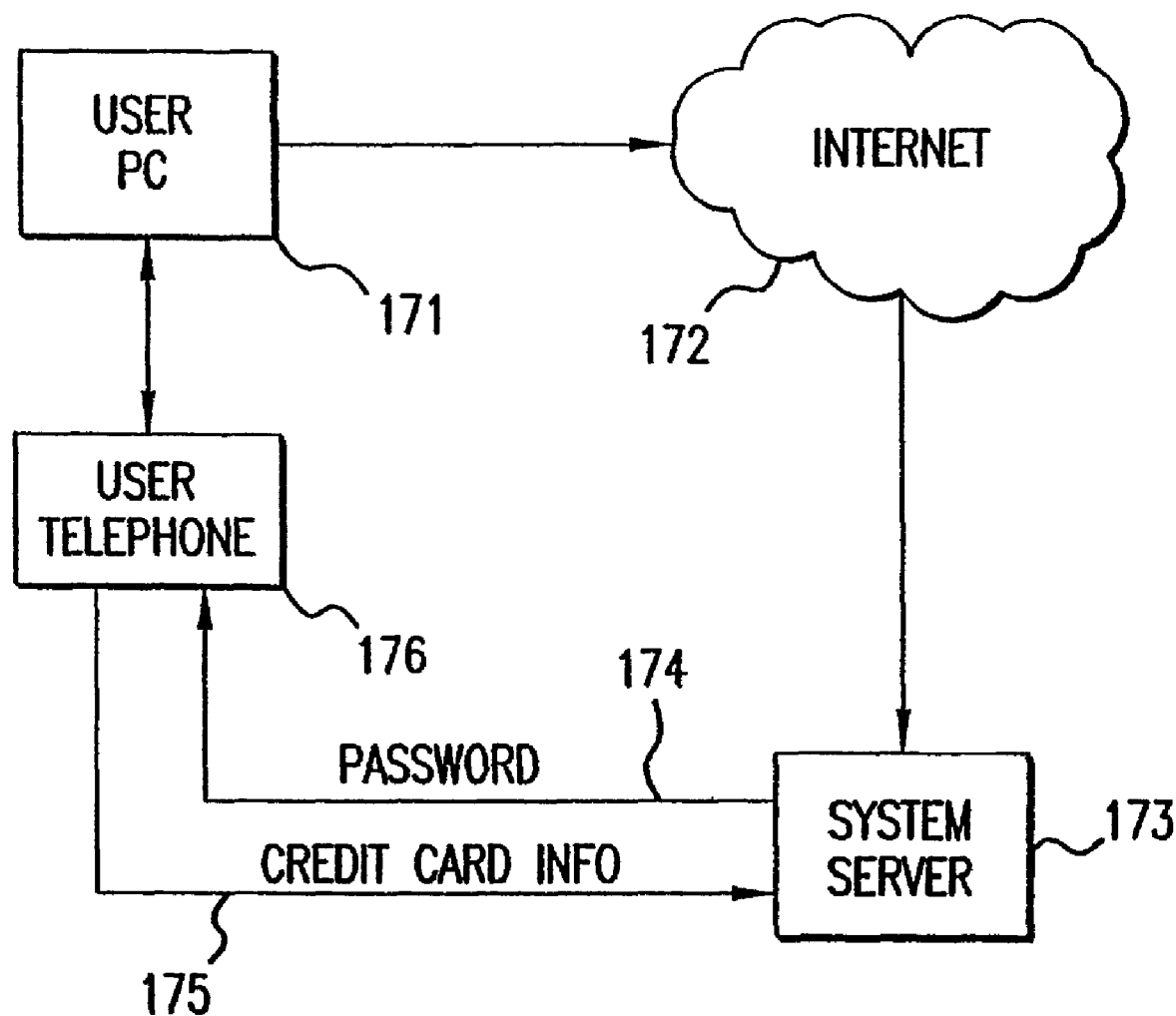
FIG. 17 depicts a dial-back security mechanism for transmitting sensitive information to the web site.

Screen 1 (22) elicits investor identification information to permit log-on (e.g., investor name, password and certain other information for security purposes). Investors will be permitted a number of secure mechanisms to provide credit card and other information to the system. Under one embodiment, however, (FIG. 17) an investor 171 accessing the system 173 over the Internet 172 for the first time will be provided a password and log-on identification without having to provide any confidential information, such as credit card information, to the processing site. The site will then call the investor back 174 at a number supplied by the investor, or the investor can access the site through a direct telephone call. The investor can then supply the processing site with the necessary information by touch-tone input of the site assigned password and the investor's confidential credit card information 175. Once the site has the credit card information through direct telephone connection, it need not be provided to the site again and the investor then uses the investor-site-specific password and log-on identification for communications. Those passwords and log-ons will be useless for any purpose other than communication with the site, and the credit card information never travels on the Internet.

Once the investor enters the appropriate information, the program flow moves to screen 2 (23).

Screen 2 (23) provides instructions for new investors for their first time through the system. For existing investors the screens are somewhat different, but the general flow is the same. The information provided includes a series of educational facts, links to other sites (such as for academic journals or books on investing or studies posted to the site or other services including e-mail, etc.). Investors can bypass this screen by selecting a switch to prevent the program from stopping on this screen during future executions of the program. In any case, program flow then proceeds to screen 3 (24).

Screen 3 (24) provides a listing of options for the investor (e.g., create a new account, provide preferences, modify existing portfolio preferences, purchase or sell a specific security, provide wire transfer or other instructions, engage in tax review or planning, monitor price changes in the portfolio, establish weekly dollar contributions to the portfolio for "dollar averaging" or other purposes). The investor is also provided the option to navigate through the site and skip over subsequent screens if the investor wishes (as would be expected of experienced investors seeking to modify or simply review an existing portfolio). Program flow then proceeds to screen 4 (25).

Screen 4 (25) elicits from the investor information (see FIG. 2) to create an asset allocation model for the investor (again, only if the investor wishes, some investors may skip this). Generally, an asset allocation model helps an investor determine present investment allocations based on current assets and liabilities, current income, future needs and other factors such as age. In general, the model determines how much should be invested in equities, bonds and cash to reach the goals of the investor in the time remaining. There are many publicly available asset allocation models. For example, Quicken™ includes one as part of certain financial planning software. The *Wall Street Journal* has provided one as part of certain subscription offers. Either of these or others can be used to create the asset allocation model based on the investor input.

If the investor already has entered this information (e.g., the investor already has an account in the system), the existing information is then displayed. This screen also elicits information that is used to obtain basic information involving the investor's use of the system, such as suitability for certain types of investments and to ensure compliance with various legal requirements, including determining whether the investor qualifies as an "accredited investor" or a "qualified investor" under various federal and state laws. To be an accredited investor or a qualified investor an investor must satisfy certain criteria. Once the investor has entered this information, the system then verifies this information in the normal manner.

Screen 4 (25) also elicits information from the investor that is employed in creating a risk-return preference function for the investor. Such information includes volatility levels, risk, required rate of returns (based on the above asset allocation model), etc. The utilization of various parameters to establish that function is then employed to set initial defaults, which can be modified if desired by the investor in Screen 5 (26). Program flow then proceeds to screen 5 (26).

Screen 5 (26) provides for the new investor, or for an existing investor who wishes to modify a portfolio to change preferences, a screen that provides a menu of preferences to set (see FIG. 4 for an example). The menu includes listings for preferences that relate to, among other things (and to be modified over time as investor choice dictates): type of security by market capitalization, book-to-market, price-earnings ratio, price of stock, geographic sector, product sector, dividend payout, historic price to current price, earnings growth and similar economic factors, and non economic factors such as specific business lines (for example, tobacco, managed health care or defense that may be viewed as of interest or controversial), engaging in business in particular countries (such as Burma or China or Northern Ireland and ratings from third party sources as to how the selected companies have performed in those countries), executive compensation and other corporate governance factors that are rated by third parties, etc. Depending on which factors the investor selects in this screen as being of interest, the investor is then presented with other choices through, for example, drop down menus or supplemental screens that review the specifics of the selections and solicit additional choices. For example, if the investor selects market capitalization as a factor in the selection of stocks for the portfolio, a drop down menu allows the investor to select a variety of capitalizations (e.g., eight ranges could be presented, such as a market value of less than $25 million, $25 to 100 million, $100 to 500 million, $500 million to $1 billion, $1 to 2.5 billion, $2.5 to 5 billion, $5 billion to 10 billion, or over $10 billion) which could be selected by pointing a mouse and clicking. If the investor wished to obtain more information, such as a sample of companies within each range, then the investor would select "more information" or a similar box. The investor is then presented with a screen that provides the additional detail that was requested.

When finished with that drop down box or screen, the investor then returns to the initial or other screens that are part of Screen 5 (26) and repeats the procedure setting the parameters for any other factors for which the investor has preferences.

Referring to FIG. 4B, alternatively, or additionally, the computer-based system of the present invention also allows the investor to be presented with suggested portfolios created through other means—such as a recommended portfolio that reflects a specified strategy, such as the ten under performing stocks from the Dow Jones Industrial Index, or from a selected analyst, or from a magazine or other publication, or from a selected organization or through collaborative techniques. As shown in FIG. 4B, the investor can select from a category of portfolios 71-76, under each of which the investor can then select a particular type of portfolio within that category. For example, the investor can select an average portfolio for people with the same number of children as the investor by selecting "Similar Demographics" 74 and then "Number of Children" 77.

As further examples, a noted analyst may state that her ideal portfolio would be the following fifty stocks in the following proportions, or a magazine may give its picks for the "ideal" portfolio, or a charitable organization may provide a list of the corporations that have done the most for the charity, and individual donors to the charity may wish to build a portfolio of corporate contributors, or a union may wish to provide a list of companies it works with who it believes are good companies and may recommend that members acquire shares in those companies. In any of these types of cases, Screen 5 would make available the list of companies and the suggested allocations (or if no allocation is provided by the entity creating the list, then in accordance with appropriate diversification requirements, risk and other preferences of the investor, as provided previously). Furthermore, the computer-based system of the present invention automatically employs known collaborative filtering techniques, such as those utilized through a Firefly Network system (www.firefly.net) because the system already has the investor's preferences entered into the system. In this instance, the investor's preferences entered into the system are used to identify securities that may be of interest to the investor that have been specifically identified and transacted by others with similar preferences. Entire portfolios can be presented. For example, if an investor who enters preferences regarding certain types of stocks then separately determines to buy another specified stock, then if another investor enters similar preferences as the first investor, that second investor could be notified that an investor with similar preferences also specifically added for purchase this other security and the second investor may wish to consider adding it as well. In this manner, the system of the present invention can be used to facilitate the creation of diversified portfolios created by the equivalent of investment clubs.

In any of these pre-packaged, analyst, group or collaborative recommendations, the investor is able to select the entire portfolio as defined, and specify the dollar amount to be invested as per Screen 8 (29) (or if the investor has more securities to include then the investor would continue through with the program flow, or the investor could subtract specified securities from the suggested portfolio, such as by removing any tobacco stocks from the portfolio, or by changing the weighting of the securities in the portfolio as described in the program flow Screen 7(28) below). Consequently, one of the investor's preferences and a screen available to the investor is a selection of suggested portfolios that represent pre-packaged portfolio strategies, or are recommended by particular analysts, groups or others. Program flow then proceeds to screen 6 (27).

In each case, and in each of these screens, the investor is presented with a default set of preferences that the system recommends based on the investor's stated general goals and the investor information entered in earlier screens. For example, if an investor specified that he wished very little risk in his portfolio, and high dividend payout, but then selected capitalization exclusively under $25 million, the system alerts the investor to the fact that there are insufficient companies that satisfy these preferences to create a reasonably diversified portfolio. The system then recommends that the investor permit the system to select from any size capitalization or suggest the investor change some of the other parameters that are constraining the choices, such as the dividend payout.

For those factors or parameters for which the investor wishes not to make a selection, the system uses defaults to create a portfolio that satisfies the other criteria, if any, that are selected by the investor. If no factors or parameters are selected at all, then the system creates a default portfolio based on the asset allocation, risk-return preference and other information, such as age and income, that the investor has provided the system. The number of different portfolios that the system can create is extremely large (almost limitless and in any event far in excess of the number of potential investors), and there is no expectation that any two investors would have identical portfolios (although they could if they so requested (such as members of a family that wish to have separate accounts but identical portfolios, or an individual that wishes to have multiple accounts (such as an IRA and a non-IRA account) with identical portfolios), or if two persons happened to make identical selections on all parameters, or used defaults in all cases with identical age and income ranges, etc.). Essentially, the system engages in an interactive process with the investor via the main server and the investor program executing on the investor's computer. The investor's program prompts the investor for the information needed by the main server to determine the portfolio or to create the asset allocation model. However, some of these selections made by the investor can affect the asset allocation model, such as limiting the volatility, which can cause the program to indicate that the investor must increase the allocation of resources to equities to achieve the desired investment goals. Consequently, the process can be viewed as either a two stage process, the first stage of which determines the asset allocation model, and the second stage of which enables the investor to select the desired securities in his portfolio, or as a single interactive process during which the investor selects both the general categories of investment vehicles and states his investment goals, which are often interrelated. If there are limits imposed (by a plan sponsor or employer perhaps, or by the investor itself for its own account or for another account over which the investor has authority (which could also be a corporate account or some other account where parameters are set by one entity and the actual trading or execution selection is made by another)), the limits would be made apparent in these screens and the investor directed to make choices that comply with the limits.

Screen 6 (27) then presents the investor with his choices and selections and seeks confirmation of the choices. If the investor wishes to modify any of the choices, the investor is then returned to the appropriate prior screen (such as Screen 4 (25) or screen 5 (26) depending on the parameter to be modified). If the investor confirms the choices, he moves to Screen 7 (28) which displays the portfolio. Program flow then proceeds to screen 7 (28).

Screen 7 (28) provides the investor with the selected portfolio (see FIG. 5 for an example). The portfolio can be presented in a number of different formats for the investor. Those formats include: a list of the actual stocks to be included, the relative percentages (see caveat below) each such stock comprises (by expected dollar allocation) in the portfolio and the risk, relative to the average, of each such stock (see below); by type of security selected (such as the percentage that are in one range of market capitalization as opposed to another) and various other factors that reflect generally the factors that can be selected by the investor; and, by risk and performance of the portfolio as a whole.

Both risk and performance are based on the historical activity of the stocks and are presented graphically, with portfolios that are riskier than specified averages shown as such by volatility charts, and by words such as "this portfolio, on a historical basis, would lose or gain 10% of its value relative to the [specified] index 5 out of 100 trading days." The portfolio could also be displayed as expected values in dollar amounts based on historical returns and volatilities, with probabilities and sensitivity analyses being performed. The output could be a graph showing the expected distribution of the values (much like a bell shaped curve showing the average expected value and the tails showing the high and low expected values at specified levels of likelihood (or some particular numbers such as "this portfolio would be expected to double in value over ten years but there is also a five percent chance that it will be worth only 60% or less of its current value in ten years."

When the portfolio is displayed as a list of securities to be included in the portfolio, the risk for each such security would be shown graphically, such as by a color or a bar next to the stock. As an example, the bar would be shaded one color (such as yellow) for stocks riskier than the average and another color (such as blue) for those less risky than the average (see FIG. 13 for an example), or the bars would extend to the right of each listed stock for those stocks that are less risky and to the left for those that are more risky. The longer the bar, the further it departs from the average. An investor wishing then to increase the level of riskiness in the portfolio can either return to the screen where risk levels are set with the result that the portfolio will be readjusted to be riskier, or select those stocks that contribute to higher levels of risk and increase the allocation to such stock, or add to the level of risk by specifying that margin should be used (in other words, that the investor will request a loan from the intermediary running the system or another source to acquire securities on a leveraged basis), thereby increasing the risk level of the portfolio. In addition, if the investor wished to make the portfolio similar in risk levels to some other portfolio, such as a fund that the investor was accustomed to investing in, or wished to make the portfolio more or less risky than that fund or some other portfolio, the investor would be given the opportunity to specify the precise risk level desired by inputting the desired risk level into the system, either by changing the position of the pointer on a dial, or another device described herein for specifying the overall risk level of the portfolio.

More generally, at this point, the investor can manually adjust the portfolio in whatever manner he sees fit by increasing or decreasing the selection of a particular stock, or by adding a stock that is not otherwise included in the portfolio and specifying the percentage to be allocated to that stock.

The investor is also provided the opportunity to specify whether some or all stocks should not be purchased if the price moves materially beyond the current price at the time of execution (if the system operator is not executing the order immediately and assuming the price movement risk as a pre-aggregator). Program flow then proceeds to screen 8 (29).

Screen 8 (29) provides the investor with final confirmation of the portfolio, and solicits from the investor the amount to be invested in this portfolio. The investor enters that information as a dollar amount. Because the precise prices at which the specific stocks are to be purchased will not be known until the time of purchase (if the system operator is not executing the order immediately and assuming the price movement risk as a pre-aggregator), the number of shares of any particular stock to be allocated to a particular portfolio needs to be somewhat approximate to accommodate price swings prior to the execution of the trade. With that caveat, the portfolio allocations and the specific securities to be purchased are then stored either in the storage facility on the investor's computer and when transferred to the main server stored there as well, or stored just in one location. The precise number of shares to be purchased and allocated to this investor are determined at the next transaction window based on the then current prices for the stocks as they are purchased for the account of that investor. The portfolio is then updated and stored by the system for access the next time the investor logs onto the system.

Figure 8:
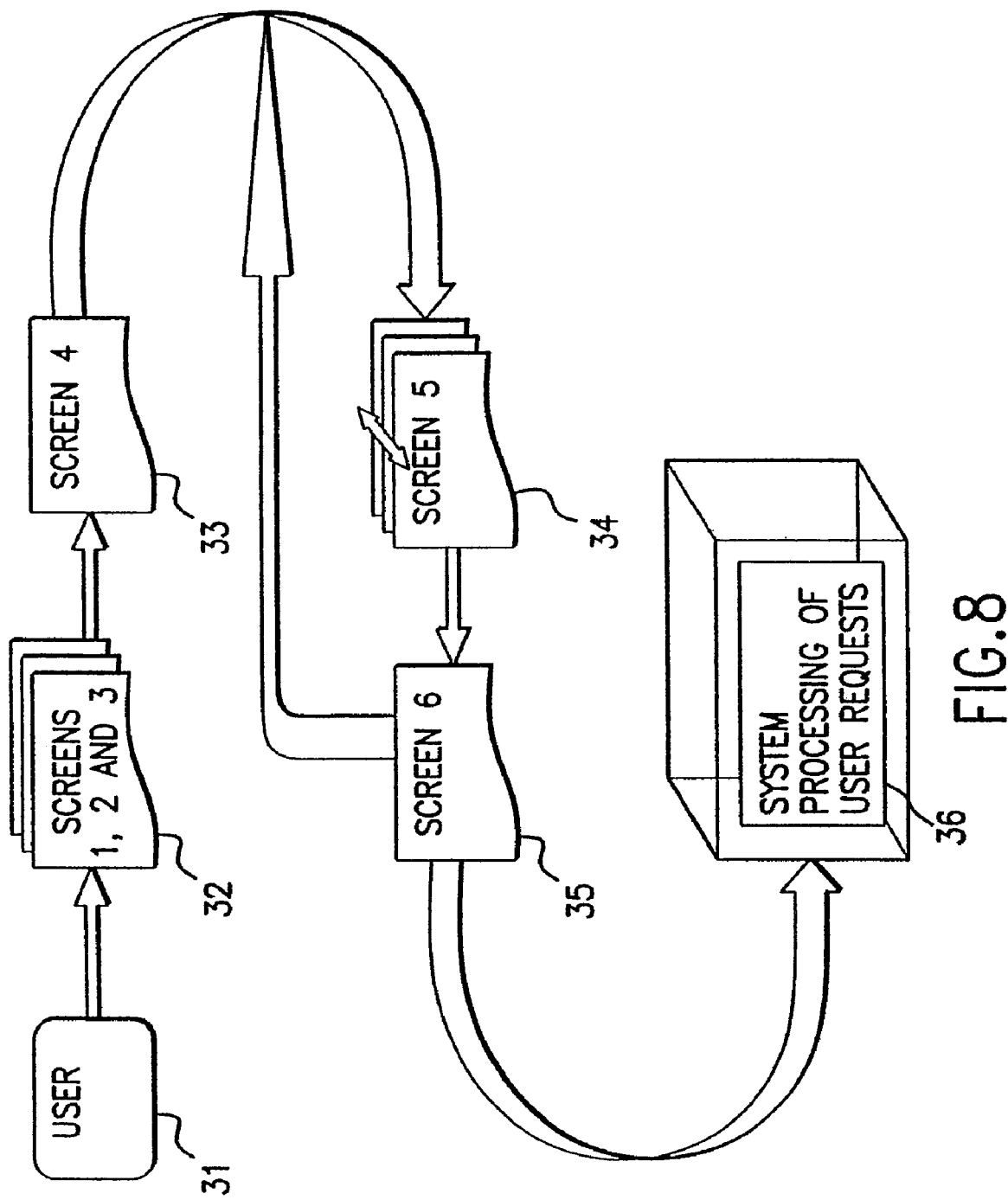
FIG. 8 depicts a flow chart of the graphical investor interface presented to the investor in connection with the investor employing other features of the system according to the computer-based system of the present invention.

FIG. 8 depicts one possible flow chart of the graphical investor interface presented to the investor in connection with the investor employing other features of the system.

Screens 1, 2 and 3 (32a, 32b, 32c) are the same as in FIG. 7, except that a menu is presented as soon as the investor logs on that permits him to skip directly to alternate screens without having to sequence through Screens 2 (32b) and 3 (32c). In other words, the choices in Screen 3 (32c) are presented as a "toolbar" upon log-on that the investor can directly access in order to move to any of the other screens in the system. After screens 2 (32a-32c), program flow then proceeds to screen 4 (33).

Screen 4 (33)—the first screen an investor sees after the log-on, assuming the investor selected alternatives from the "Screen 3-equivalent-toolbar" other than "create or modify a portfolio"—provides a menu of alternative services. Those services are varied, and depend to some degree on the investor. For example, offerings of securities pursuant to private placements can be made legally only to "accredited investors." Consequently, the system identifies those investors who are accredited investors and provides to them a menu item for reviewing private placement opportunities. Conversely, the system does not provide such a menu item to non-accredited investors who, under current law, cannot receive such offerings. Program flow then proceeds to screen 5 (34).

Screen 5 (34) is the operational screen for the services selected by the investor. If, for example, the investor wishes to evaluate the portfolio for tax effects, this Screen 5 (34) permits him to do so. The investor would specify in the tax effects communications menu the relevant parameters selecting from those available—such as stocks with losses, stocks with gains, long-term versus short-term gain or loss, combinations of the parameters, or all current tax positions. The system would then display for the investor the stock positions that satisfy the investor's parameters, with dollar amounts listed. Because of the way the system works—allowing for frequent additions of dollar amounts to the portfolio for strategies such as dollar cost averaging, and for frequent adjustments to the portfolio securities themselves, it is possible that an investor would have gains and losses in the same stock (for example, if the investor had bought 10 shares of a stock at $20 and ten shares of the same stock at $30 and the stock is now trading at $25, the investor would have gains and losses in the stock when each transaction is viewed separately). In that instance, the system would display the stock as having both such gains and losses. The investor would then be presented with a series of options as to what he would like to do next. These options are smart options and context sensitive so that, for example, an investor is able to sell individual securities simply by highlighting those securities in the list and clicking a command something like "sell at next portfolio adjustment." The transaction is then added to the portfolio as an adjustment and executed at the next transaction window. If the investor wished to sell immediately, the investor would highlight the securities and click "sell immediately" (for which it is contemplated that an extra charge would be levied). In either case a confirmation window either pops-up confirming the investor's choice at that time, or the confirmation is deferred to the end (at the investor's option) when the investor confirms all requested actions.

The computer-based system of the present invention also provides tax preparation as it relates to transactions occurring through the invention. Specifically, as is necessary to provide the gain and loss information as described above, the computer-based system of the present invention tracks the tax basis information (including acquisition date) of securities purchased through the system and the sales price for such securities as well as any costs involved in maintaining the portfolio. Consequently, the system executing the computer-based system of the present invention provides investors with a complete downloadable Form 1040 Schedule D as it relates to transactions in the system. That Schedule could then be supplemented with any other capital transactions the investor may have. Similarly, the system could provide for one-step exporting of this Schedule D type information to popular tax preparation packages, such as Turbo Tax™, for example. This downloading and exporting enables an investor to use the system with a low level of inconvenience.

If the investor had selected in Screen 4 (33) another service, such as reviewing private placements if the investor is an accredited investor, or reviewing public offerings, or buying or selling specific securities outside of the portfolio, or buying or selling other items that would be offered including, for example, other financial services such as insurance or commodities or futures if permitted by applicable law, or non-financial services such as books or software relating to investments, or if the investor wished to engage in chat room activities or discuss selected companies for which the system would host conversations with the executives of such companies, etc., the investor would enter any of those other services through this Screen 5 (34).

If the investor permits, the system can also rely on the information provided by the investor to present the investor with other possibilities of interest, along the lines described above, in a more proactive manner. For example, if the investor is an accredited investor and specifies an interest in private placements involving Internet-based publishing companies, the system will specifically alert the investor, when she next logs-on, to the existence of such an offering, and provide a means for the investor to obtain the necessary information to participate.

The investor is in a position to move between the operational screens, and engage in a variety of activities as mentioned. Program flow then proceeds to screen 6 (35).

Screen 6 (35) lists the actions the investor determined to take in Screen 5 (34), to the extent the actions require a transaction of some sort, and then seeks confirmation of those actions. If the investor wishes to modify any actions he is returned to Screen 5 (34) for adjustments. After confirmation, any transactions are effected. The system processes and stores the information if it relates to a transaction or requires portfolio adjustments, etc.

Web Server Program

Figure 9:
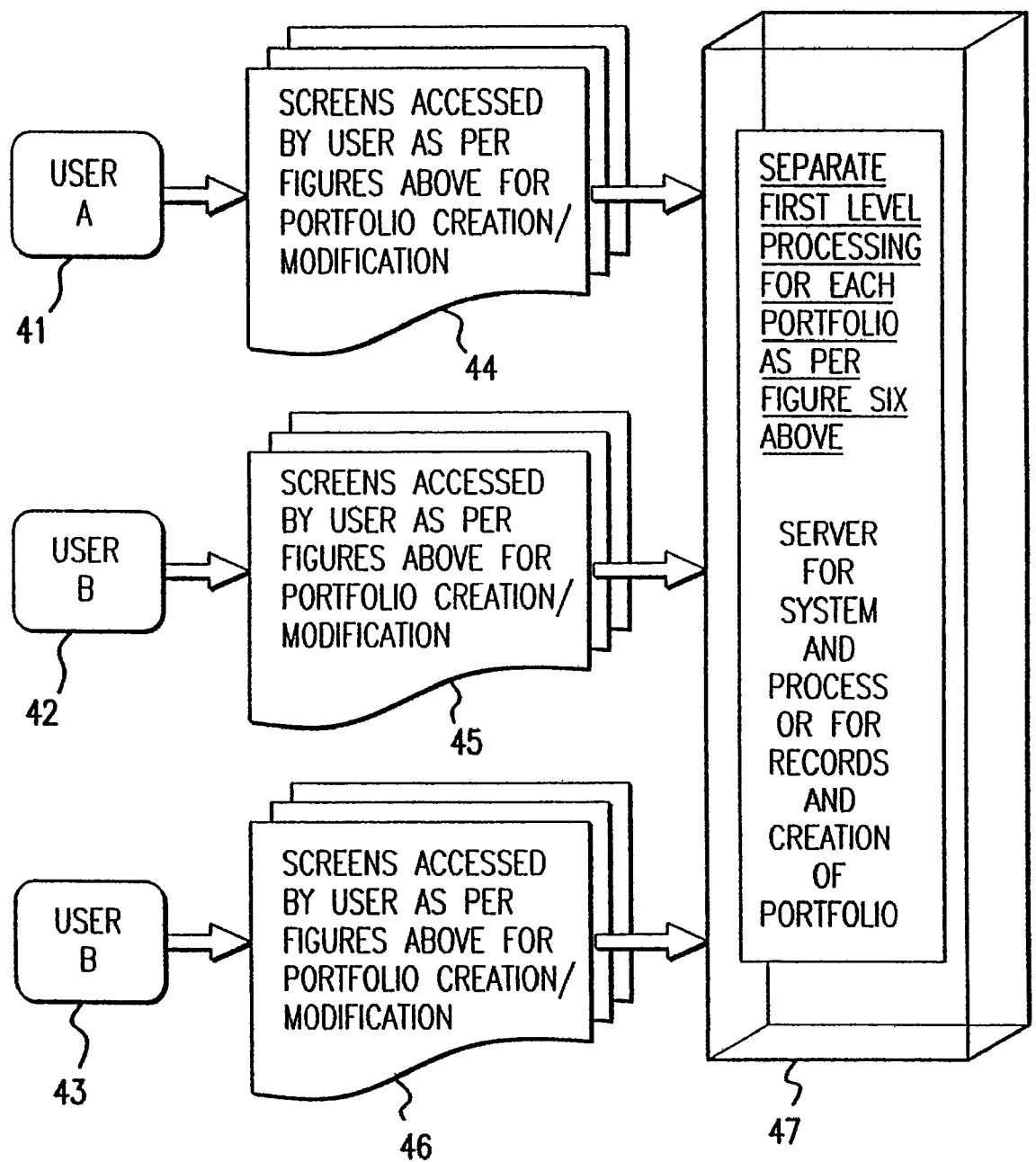
Figure 10:
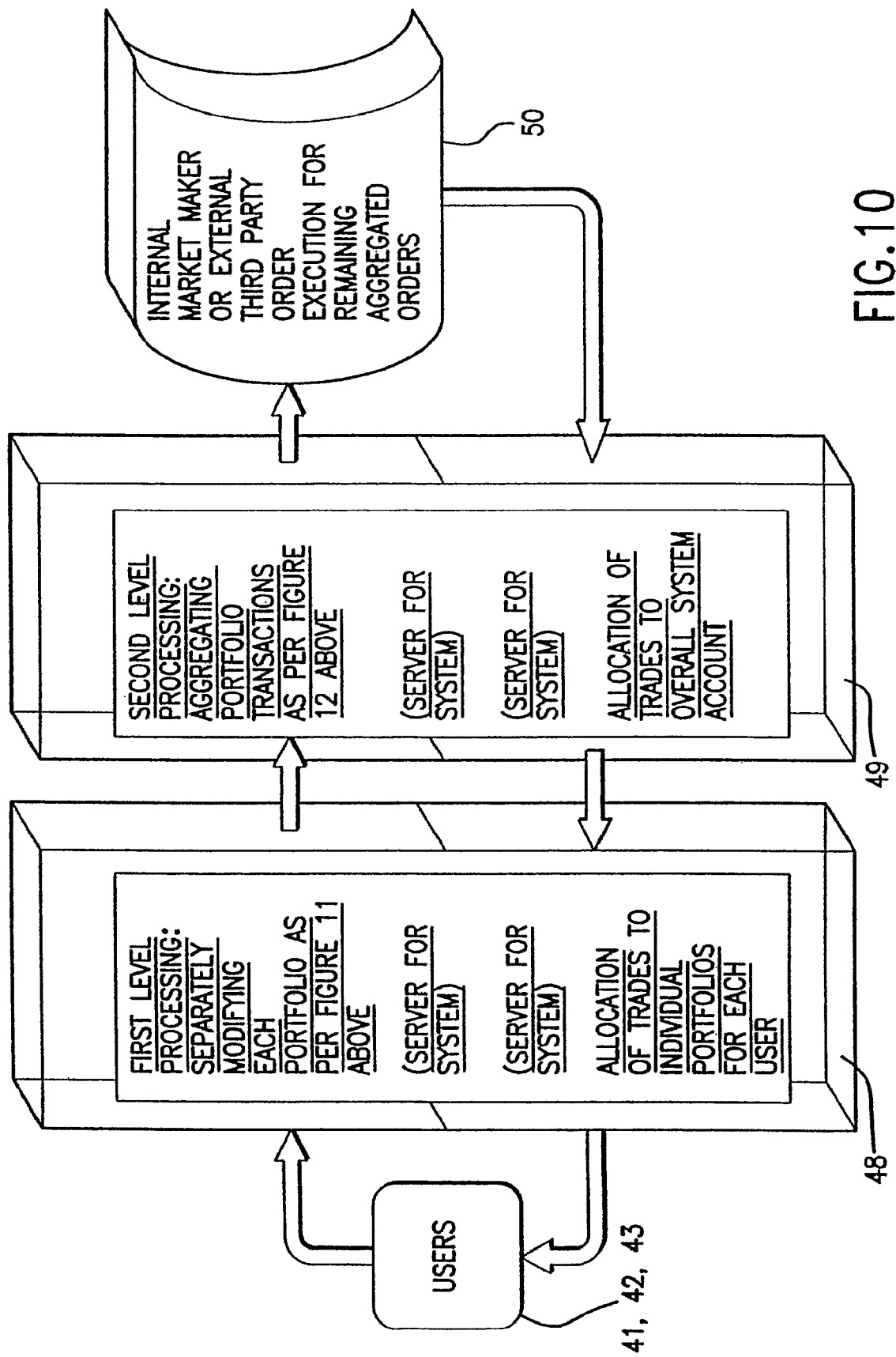

FIGS. 9 and 10—together with FIGS. 11 and 12—depict a flow chart of the processing occurring at the Web server. In general the Web server provides communications between all investors and other systems external to the computer-based system of the present invention, such as the third party payment system, and the third party trading system.

FIGS. 9 and 10 show one of the strong advantages of the computer-based system of the present invention: namely that the number of trades that must be executed externally to the system to implement portfolio adjustments is reduced dramatically. As indicated in FIG. 11, Investor A wishes to buy 100 shares of security A, Investor B wishes to sell 50 shares of security A, and Investor C wishes to buy 150 shares of security A, giving a total of 250 shares of security A to be purchased and 50 shares of security A to be sold through the system of the present invention. The net result is that 200 shares of security A need to be purchased by the system of the present invention, which can be implemented with a single transaction.

Also shown in FIG. 12, Investor A wishes to buy 200 shares of security B, Investor B wishes to sell 50 shares of security B, and Investor C wishes to sell 150 shares of security B, giving a total of 200 shares of security B to be purchased and 200 shares of security B to be sold through the system of the present invention. The net result is that 0 shares of security B need to be purchased or sold by the system of the present invention.

As further indicated in FIG. 11, Investor A wishes to buy 100 shares of security C, Investor B wishes to sell 100 shares of security C, and Investor C wishes to sell 50 shares of security C, giving a total of 100 shares of security C to be purchased and 150 shares of security C to be sold through the system of the present invention. The net result is that 50 shares of security C need to be sold by the system of the present invention, again only one trade needs to be executed externally to the system.

In this example, the number of trades needed to execute portfolio creations or adjustments is reduced from 9 to 2 with netting and from 9 to 6 without netting. As a further example, assume the invention was employed on a system that was being used by 10,000 investors creating and maintaining their portfolios from a list of 750 stocks. Assume further, that each investor is engaging in just five transactions relating to his portfolio during a given period. The number of transactions that would normally have to be sent to an exchange or third party market maker or be executed by the broker as dealer would be 50,000. By contrast, employing the invention, the maximum number of trades the system would theoretically have to execute would be 1500 (two trades—a buy and a sell—in each stock) assuming no netting of buys against sells, and 750 (one trade in each stock) if there is netting of buys against sells, i.e., either a single buy or a single sell depending on whether the total number of shares being bought exceeded the total number of shares being sold or vice versa. In the first case, the computer-based system of the present invention saves the costs associated with 48,500 trades, and in the second case, the computer-based system of the present invention saves the costs associated with 49,250 trades—a ratio of over 30:1 in savings!

The computer-based system of the present invention, therefore, is advantageous with or without netting. As a further illustration, increasing the number of investors in the above example to 100,000 would increase the number of trades under ordinary brokerage to half-a-million. Employing the computer-based system of the present invention, the theoretical maximum number of trades remains at 1500 (or 750 with netting). According to the computer-based system of the present invention, therefore, increasing the number of investors, or the number of transactions they wish to engage in, simply increases the likelihood that the actual number of trades the system needs to execute will more frequently approach the applicable theoretical maximum. Costs therefore can be maintained at a low level in part because so few actual trades need to be executed, even assuming every trade is sent to a third party for execution.

Graphical User Interface During Creation/Modification of Investor Portfolio

Figure 13:
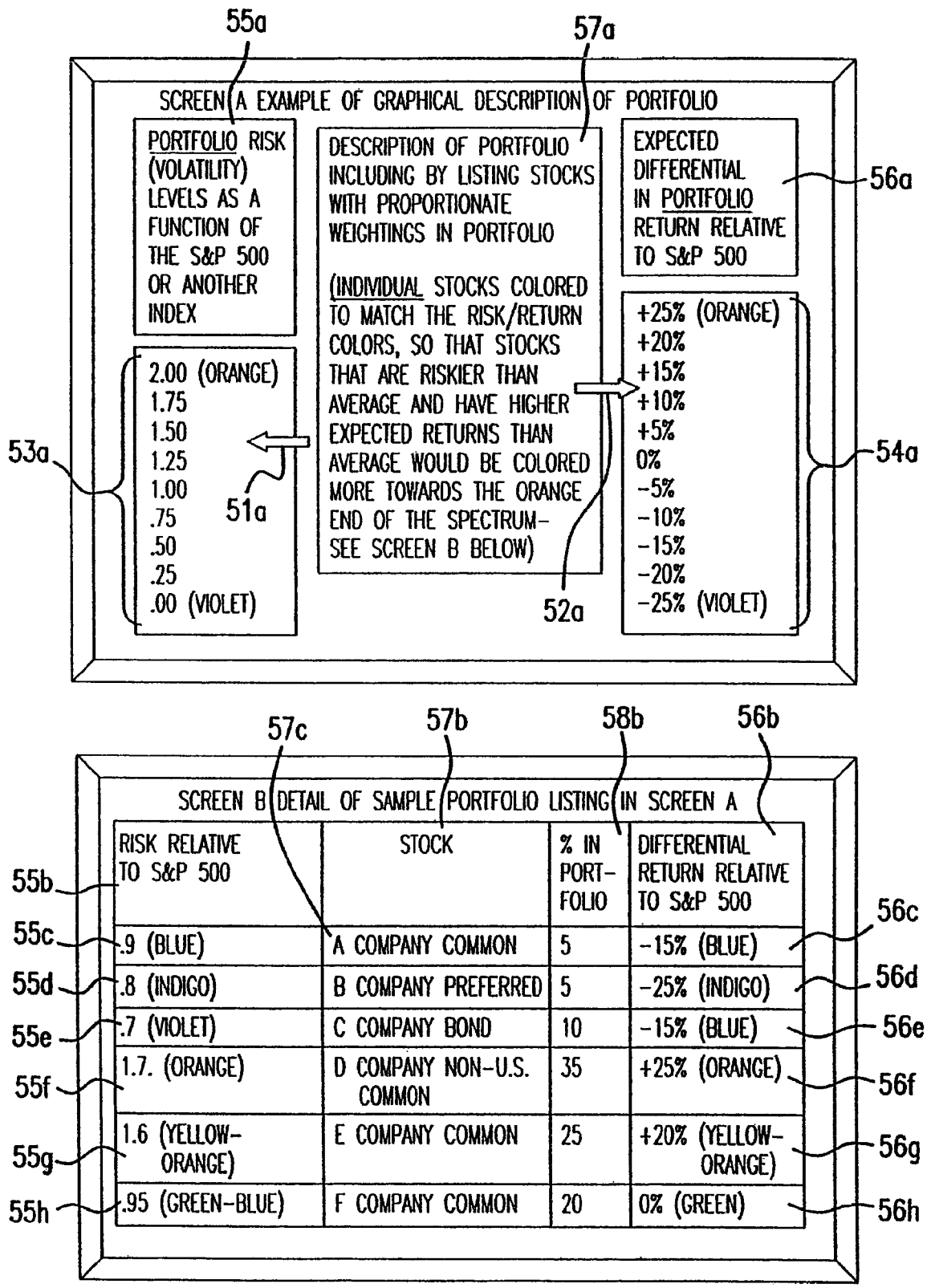
FIG. 13 depicts certain screens presented to an investor during various steps in the process of creating or modifying a portfolio according to the computer-based system of the present invention.

FIG. 13 depicts certain screens that may be presented to the investor during various steps in the process of creating or modifying a portfolio.

Screen A shows one form of a general presentation of the risk 55*a* and expected differential in return 56*a* of a chosen portfolio 57*a* of six stocks. The benefits of diversification can be obtained by using a number of securities in the portfolio, with the number usually being in excess of twenty. In actual operation then, the number of securities in the portfolio would generally be at least twenty or more since, as noted, part of the purpose of the invention is to allow the benefits of diversification to be provided to the investor. Consequently, unless the investor determines otherwise, the number of securities in a portfolio will usually be at least twenty and generally would be materially higher.

As the investor increases or decreases the relative percentage of the stocks (six shown in this example) in the portfolio there will be a corresponding adjustment in the risk 55*a* and return 56*a* for the portfolio with the pointers 51*a*, 52*a* either moving up or down. In this example, the strips 53*a*, 54*a* along which the pointers 51*a*, 52*a*, respectively, move would be color-coded (much like a litmus testing strip). The color-coding will be used in connection with the presentation of the individual stocks in the portfolio as shown in Screen B. The pointers 51*a*, 52*a* could be a dial, or any other device for showing one value relative to another, and could be used with or without the color-coding.

Screen B shows a detail of Screen A with the stocks specified and their relative contributions to the portfolio and their respective risks 55*b* and differential returns 56*b*. An investor will instantly be able to determine which stocks are contributing higher levels of risks and presumably higher levels of returns to the portfolio and, if desired, adjust them to modify the risk/return levels in the portfolio (but see below). Obviously, a number of combinations will not be available as limited by the specific stocks selected. In that instance, the system generates a statement that the combination requested is not possible and suggests alternatives such as other securities (e.g., money market funds or preferred stocks or AAA-rated short-term notes, which in a real portfolio would be added to the mix in Screen A or B) that could lower overall risk and returns or leveraging (which would be shown as a bar increasing the risk of the portfolio) that could increase it, or different stocks with different characteristics, depending on what preferences the investor had earlier inputted into the system.

Alternatively, and importantly, the investor could adjust the pointers 51*a*, 52*a* in Screen A up or down (or the hand of a dial, or the color code on a litmus-type strip, etc.) and the system will recalculate the required mix of the portfolio's stocks. The investor may be required to adjust the overall mix of the securities in the portfolio in order to comply with limits established by a plan sponsor or employer, or the investor itself or by the investor on behalf of another over which the investor has authority (which could also be a corporate account or some other account where parameters are set by one entity and the actual trading or execution selection is made by another). This important dynamic interface is a major advantage of the system in that it allows investors to adjust their portfolios to desired risk-return characteristics by directly adjusting the risk and return pointers or dial or colors and having the system automatically determine what change in weighting of the securities comprising the portfolio is necessary to accommodate those desired characteristics. Thus, investors are afforded a simple click-of-a-mouse mechanism to adjust their entire portfolio to precisely the types of portfolio characteristics desired without having to know about the various interactions of securities with each other or the portfolio effects of changing one security or another or have any other knowledge! And as noted above, if the investor wished to make the portfolio similar, or greater or lesser, in risk levels to some other portfolio, the investor could specify the precise risk level desired by inputting the desired risk level into the system, through any of these means.

Screen B also shows the calculation of the risk (beta) 55b-55h and expected differential return levels 56b-56h for the stocks that are used to calculate the portfolio risk levels 53a and the expected differential returns 54a of the portfolio. It would also be made clear that a principal benefit of the computer-based system of the present invention and the concept of using a portfolio for investing instead of individual stocks is the notion that the riskiness in any one stock held in a portfolio may be different from the riskiness of that stock held by itself (thereby generating some of the benefits that stem from diversification, etc.). Consequently, investors will be cautioned to focus on portfolio risk/returns, not individual stock risk/return. Again, then, there is a great advantage to investors as described above from being able to adjust their whole portfolio characteristics just through moving a pointer (51a, 52a in Screen A up or down (or the hand of a dial, or the color code on a litmus-type strip, etc.)), as opposed to having to consider and understand the effects on the portfolio from modifying individual stock positions. Thus less than expert investors, for example, can have their portfolio adjusted automatically by having the system re-weight or add cash, or leverage, when the investor adjusts the pointers, dials or colors.

The scales, etc. can all be adjusted to make the presentation easier to see for different portfolios.

As shown in screen B, Common stock in company A 57c has a risk relative to the S&P 500 of 0.9 (which is blue on the color coded litmus test example) 55c, it represents 5% of the total value of the portfolio, and its differential return with respect to the S&P 500 is negative 15% 56c, which is also depicted in blue. Each of the remaining stocks is represented in a similar manner. In this example, the stocks are listed in alphabetical order, however, they could be ordered in a different manner depending on an investor preference selection. For example, the investor could adjust the ordering to depict the stocks in order of total value of the portfolio, from low to high risk or vice versa, etc.

In any of these instances, the securities that can be viewed as an integrated, single portfolio for the investor can be any securities, including funds or other investments, the investor inputs into the system. Consequently, if the investor has a variety of accounts that must be maintained as legally disparate and separate accounts, then the investor can still view each of them together as a single integrated account for purposes of analysis and trade execution by having the system include whatever accounts and the securities or other investments contained therein as a single account that the investor desires (likewise, the investor can exclude any securities or other investments he wishes from being included in an account for purposes of analysis or trade execution). In this manner, the investor is provided the benefit of being able to integrate easily all his holdings and understand and manage all his accounts even though they must be maintained in legally separate accounts. Therefore, for the first time, an investor that has securities in a 401(k), an IRA and a separate trading account, and who has securities for an account of his children, can view all the holdings as a single integrated whole and manage them to obtain the benefits of portfolio theory including to ensure proper levels of diversification, sector exposure, concentration levels, overall risk, etc. The investor would do this merely by noting the accounts, or the securities or other investments within accounts, to be grouped together for purposes of acting as a single portfolio. As noted, this aspect of the present invention could also be used for similar analyses regarding other securities for which risk-return information is available, such as and primarily, mutual funds.

Figure 15:
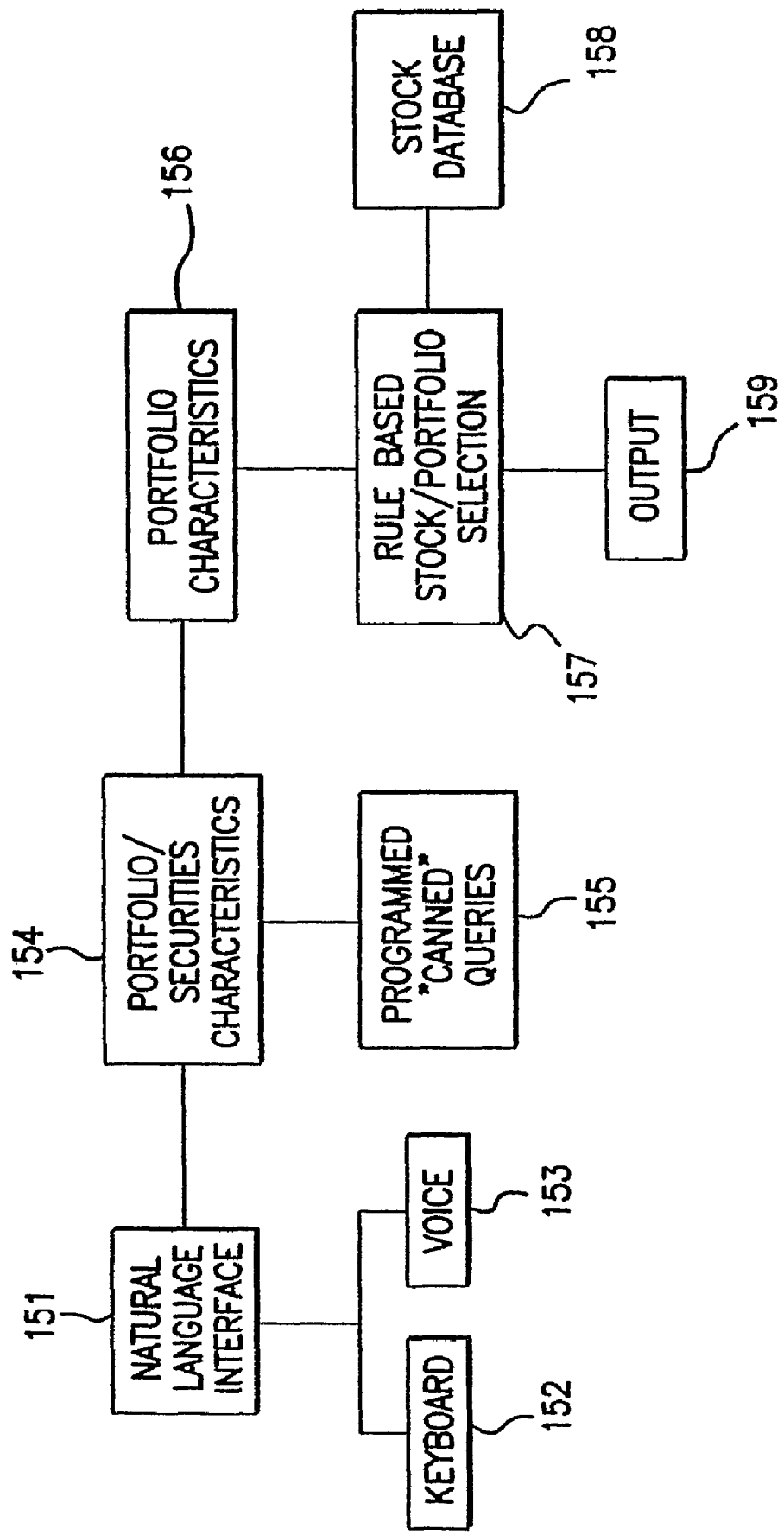
FIG. 15 depicts the natural investor interface as it relates to the computer-based system according to the present invention.

Referring to FIG. 15, the natural language investor interaction with the present invention is illustrated. The system comprises a natural language interface 151, one possible embodiment of which is a software program residing on the investor's PC or in the alternative on the server associated with the present invention. Other possible embodiments could be hardware implemented modules for interfacing to the investor's PC. The investor can input selection criteria in natural language via a keyboard 152 or if desired via a speech processor 153 which recognizes the spoken word and provides that translation to the natural language interface 151.

After interpretation of the investor's input, the natural language interface 151 provides portfolio and/or securities characteristics 154 to the system. These portfolio and/or securities characteristics are the translation of the investor's desires for a portfolio and/or security into technical terms used more commonly by the investment community to describe portfolios and/or securities.

An alternative input to the system is via a series of canned queries 155 that are displayed on an investor's screen. An example of a canned query might be "I want to invest in stocks that give me a portfolio like the market" or "I want to invest in stocks that are big companies." When an investor clicks on this choice, a series of portfolio and/or securities characteristics 154 are automatically generated for subsequent use by the system of the present invention.

If the investor has specified portfolio characteristics, the flow would proceed to the stock selection mechanism 157 to access information in a securities database 158 which comprises all manner of securities with their associated characteristics. If the investor has specified certain securities characteristics, they are inputted to a file of characteristics 156 which describes the various investment objectives of an individual. For example, an investor may wish to invest in long term and potentially high yield stocks. The portfolio characteristic generator 156 can then generate a series of rules to be used to select stocks. This rule based stock selection 157 then accesses information in the securities database 158. Once stocks are selected, they can be output 159 in a variety of ways. For example, the results can be displayed on an investor's screen, hard copy output can be provided to the investor, or an electronic file can be sent to the investor for storage and later access.

In this fashion a relatively unsophisticated investor can make desires for securities known in natural language terms yet still use all of the sophistication of the present invention.

Figure 16:
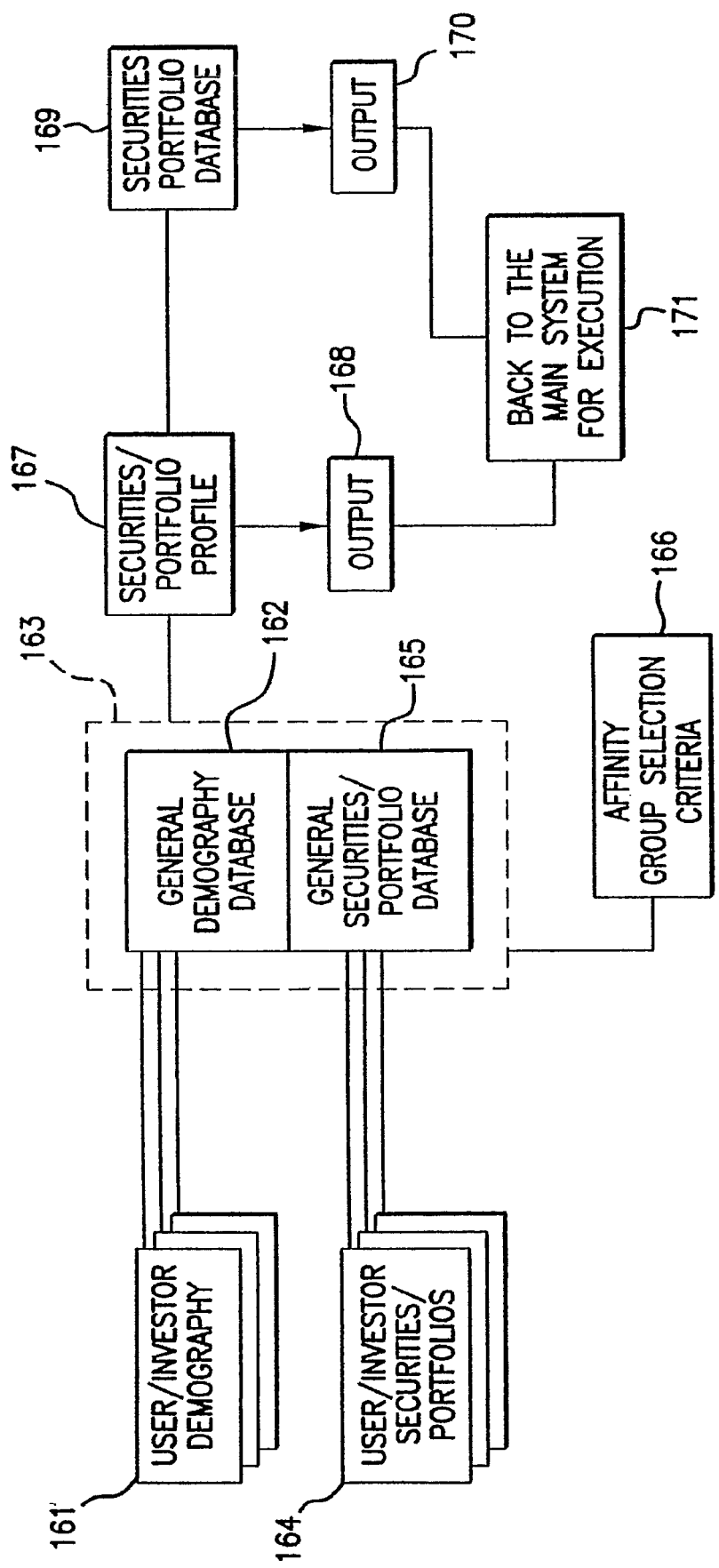
FIG. 16 depicts the compilation of affinity and collaborative filtering techniques used in conjunction with and as they relate to the computer-based system according to the present invention.

Referring to FIG. 16 the concept of affinity group investing is shown. The present invention first collects investor demographic information from each of a plurality of investors 161. That information is sent to, and aggregated by, a generalized demographic database 162 which resides within the overall investor database 163. As mentioned earlier, all of the information in this investor database is generalized so that the privacy of individual investors is maintained. The main purpose of the investor database 162 is to allow subsequent analysis of investor trends and behaviors to be made.

In a similar fashion to the collection of demographic information, individual investor security investments and portfolio characteristics are also collected 164. The specific securities invested in by and/or portfolio characteristics of a given investor are then sent to, and aggregated by, a generalized securities and portfolio characteristics data base 165. This database associates the investments made by particular groups of investors.

When an investor desires to enter an affinity group or to see screens based on group or investor characteristics or do collaborative investing, the investor accesses, via a PC or from a server a series of affinity group selection criteria 166. Such criteria might be profession, annual family earnings, education level, geographic area, and other demographic characteristics. The criteria selected to create a particular affinity group, is then presented to the investor database 163. The affinity group characteristics are retrieved from the generalized demographic database 162 and associated with the particular portfolio or securities selected from the generalized securities/portfolio database 165. This information is then used to create (depending on what the investor requested) a securities and/or portfolio profile 167 of the particular affinity group. This securities/portfolio profile can then be output 168 to the investor. Alternatively, the securities profile 167 can be input to the securities and portfolio database 169 of the present invention so that performance output 170 can be presented to the investor showing how the securities invested in by the particular affinity group actually performed, and can also be presented to the system for execution or inclusion in the investor's portfolio 171. (In a similar manner, any other portfolio that the investor may generate through any of the other means described herein could also be run through the securities/portfolio database 169 and be outputted 170 to the investor showing how the portfolio so selected actually performed.)

In this manner an investor can be quite specific about an affinity group that the investor wishes to create and identify the performance of securities and portfolios invested in by that particular group.

In a similar fashion to the affinity investing in individual securities as part of or separate from a portfolio as described above the present invention allows for affinity investing with respect to mutual funds or other instruments as well. In this instance, the investor desires to know what mutual funds a particular group has invested in as a basis for making future investment judgments. Again not only can such affinity group mutual fund investing be determined from the investor database, but the performance of the affinity group's investment can also be determined.

Additionally, if a group of investors so desire, the investors can all provide information to the system so that other investors who they permit or who are in their same group can have access to the overall portfolio of the group as a whole—either for monitoring purposes or for analysis or for trade execution. In such instance the system would identify the group as a separate group within the general demographic database 163, and access to the portfolio and securities maintained by the group or the leaders of the group (2) would be permitted to members of the group.

As noted, there will also be pre-packaged or suggested portfolios. The present invention will keep track of those portfolios. For example, the *Washingtonian* picks can be displayed for an investor who can then be given the option to purchase a basket of securities that are the same as the expert's picks that have been published. The Dow 500 and the Fortune 500 top stocks may also be tracked by the present invention with the opportunity given to invest in the same top stocks as listed in the index or the magazine. Again, performance data on the stocks and portfolios that are potential candidates for investment can be generated to further inform the investor.

It is important to note that while the capabilities of the present invention to trade in stock and mutual funds has been discussed, the system and method of the present invention is equally well suited to any tradeable security where economies of scale are of importance. Thus futures, options, bonds and other negotiable securities can equally be the subject of trading with the present invention.

An Exemplary Embodiment of the Computer-Based System of the Present Invention

Figure 14:
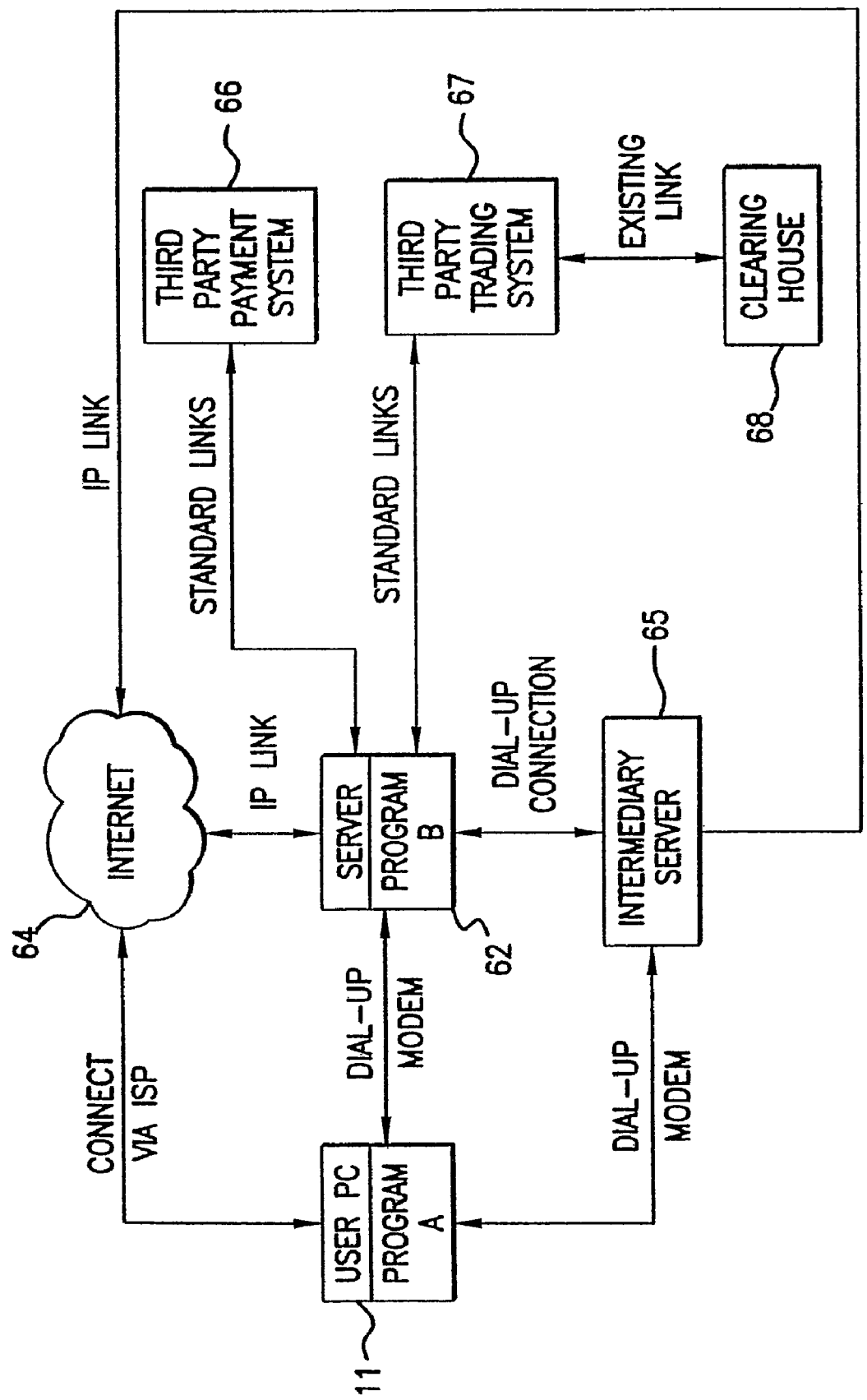
FIG. 14 depicts a block diagram of an exemplary computer-based system according to the present invention interacting with existing systems.

FIG. 14 depicts an exemplary embodiment of the overall system according to the computer-based system of the present invention. Within the computer-based system of the present invention is a server 62, which executes a program B, which controls the operation of the entire system. While another program may execute on the investor's PC 63, program A, the investor's program can be completely performed by program B. Alternatively, these two programs A and B can work together like Pointcast, or other similar programs, which download data to an investor's terminal and display this data via a graphical investor interface based on "filter" selections made by the investor. Thus, one possibility for program A is that it is merely a communication program that enables the investor to establish a link to the server 62, and set "filters," which determine what data is sent back and forth to the investor. In this case, the so-called filters consist of the stocks in the investor's portfolio and the investor's risk model, etc. Once established by the investor, the program B then performs all of the analysis and computation required to advise the investor as to the levels of risk and differential return inherent in the investor's portfolio relative to known standards. This enables tight configuration control on the investor software, which makes upgrading and security protection easier.

Alternatively, by placing more of the investor's program functionality in program A, the amount of time the server 62 is accessed by the investor is minimal, thereby enabling a cost reduction in the total amount of communication links required at the server 62. In this embodiment, the investor would only access the server to receive the data regarding the investor's stocks and to pass on new orders once the investor determined a new order. The total time accessing the server would be similar in this case to accessing one's electronic mail. Thus, there is much flexibility in creating the levels of functionality in the two main programs A and B.

In addition, the investor can access the server 62 via several communication links. First, the investor can access the server 62 via the Internet 64 using the investor's Internet Service Provider (ISP), which ultimately connects the investor's PC 63 to the server 62.

Second, the investor can access the server directly using a dial-up modem connection. This has the advantage of security in that many consider a telephone connection inherently more secure than an open connection over the Internet.

Third, the investor can access the server 62 using an intermediary, which provides the service to the investor, such as a bank, brokerage, etc. In this case, the investor either accesses the intermediary 65 using a dial-up modem, or via the Internet 64. Once the investor accesses the intermediary 65, the intermediary 65 then accesses the server 62 using either an Internet connection or a dial-up connection.

The computer-based system of the present invention also provides for an electronic payment mechanism 66 to enable the investor to make payments or transfer funds for investment or otherwise on a periodic basis, such as monthly, biweekly, etc. This would enable an investor to match his investments with his regular salary. The electronic payment mechanism 66 includes an electronic withdrawal from the investor's checking/savings account, a payroll deduction, a credit card transaction, etc.

An electronic connection to a third party trading system 67 is also provided, which enables the program to make the trades electronically. Typically, these electronic trading systems 67 include a connection to a clearinghouse 68 for settlement of the trades. While not part of the present invention, this is shown for completeness.

All of these communications links are standard and known communications links, hence no further discussion is necessary. In addition, the third party electronic payment system connection consists of one of the many known ways of making this payment electronically, so no further discussion is required either. Finally, the third party trading system could consist of a known trading system, such as the OptiMark™ trading system, or other trading system that communicates using the Financial Information eXchange (FIX) protocol, hence no additional discussion is required.

Operation of the Computer-Based System of the Present Invention

The computer-based system of the present invention is designed to provide a mechanism for a whole new financial investing system that currently does not exist. It allows investors, with expert assistance, to create, manage and modify a complex portfolio that reflects the investor's own preferences. It allows the investor to ensure that his portfolio is diversified and that it reflects the level of risk he wishes to assume. The computer-based system of the present invention also increases the investor's control over matters like what stocks he owns, the taxes he pays, and how his shares will be voted. And it permits him to purchase and sell whole portfolios and specific securities, and fractional interests in shares of securities—all for a low cost that is less than or competitive to trades of single securities through discount brokers or having an interest in mutual funds.

Investors ("Users" in FIG. 6) access a server that processes the information necessary to enable the investor to create or modify a portfolio in accordance with the computer-based system of the present invention. This access is either through the Internet, through a dial-up modem connection or through an intermediary such as a bank or brokerage that is making the invention available to investors.

Investors first accessing the system are provided a range of security measures to accommodate their own computer systems and their own concerns. For example, secure encrypted access will be supported for those investors who have it as part of their Internet browsing capability. Dial-up modem could also be available, for those who wish not to rely on the Internet, or investors could also access the system through an intermediary that possesses its own security controls and has a secure link to the invention processing site, such as a broker or bank.

In addition, security may be effected through a dial-back or dial-up mechanism. Investors accessing the system over the Internet for the first time will be provided a password and log-on identification without having to provide any confidential information, such as credit card information, to the processing site. The site will then call the investor back at a number supplied by the investor, or the investor can access the site through a direct telephone call. The investor can then supply the processing site with the necessary information by touch-tone input of the site assigned password and the investor's confidential credit card information. Once the site has the credit card information through direct telephone connection, it need not be provided to the site again and the investor then uses the investor-site-specific password and log-on identification for communications. Those passwords and log-ons will be useless for any purpose other than communication with the site, and the credit card information never travels on the Internet.

Once the investor accesses the site though whatever means, initial screens solicit vital information about the investor, such as range of income, other investments, age, financial responsibilities and financial goals and liabilities.

Investors are then provided information that solicits their preferences as to "risk" and "diversification." Their responses provide the invention the information it needs for its algorithms to work properly.

Based on this information, the invention suggests a general investment asset allocation that the investor can modify. Such asset allocation models are relatively standard and in current use. However, the standard models can be adjusted by the investor for use in the system to allow the investor to incur additional risk in order to achieve a higher return. The reason for permitting a higher risk-return level than normal is because the investor will be provided the opportunity through the invention to fine-tune—and monitor and maintain—the level of risk (based on a stock's historical volatility) selected by the investor for the investor's portfolio.

This fine tuning of portfolio risk will be far more than would ordinarily be the case, for example, for an investor attempting to select a mutual fund, because the investor utilizing the invention is able to ensure that the selected investments and their risk profile remain subject to the investor's control. In a mutual fund (other than passive or "non-managed" funds), the investor has no assurance as to what stocks, and what weighting of stocks, will be included in the fund in the future, or how much of the fund will be held in cash, and therefore no assurance that the fund will not modify its style and "risk" without the investor having advance knowledge of the change. Even in passive funds there is uncertainty as to how much of the fund is held in cash at any one time. Consequently, the mutual fund investor incurs the additional risk of the uncertainty as to a mutual fund's risk profile, thereby increasing the investor's level of risk without the investor obtaining any benefit.

Once the general asset allocation determinations and risk-return preferences are made, investors are asked, through simple screens, about any preferences they have regarding stocks, such as where securities are listed, capitalization, and business sector; various financial factors such as price/earnings ratio and growth trends, and corporate governance factors such as whether the company sells specified products, or enjoys good labor relations, etc. (Determinations regarding subjective criteria, such as whether a company has "good" or "bad" governance factors, would generally come from third party sources.)

An investor could then specify specific stocks that must, or must not, be included in the portfolio. Consequently, the invention also acts as an ordinary broker—with a very low cost that would be expected to be materially less than even deep discount brokers—when immediate execution is not required or if the system operator is willing to pre-aggregate certain trades.

If an investor seeks immediate execution for a selected trade, the invention will provide it, in the same manner as would any other electronic discount brokerage, for a fee that would be competitive with or better than that charged by the reputable discount brokers.

After preferences are entered, the invention will create a diversified portfolio that expertly matches, to the extent possible, those preferences and the asset allocation determination—all automatically.

If the portfolio is acceptable, the investor will enter the dollar amount to be invested and the securities will be purchased for the investor at the invention's next "transaction window".

For the invention to work, costs must be kept low so that investors can purchase and modify whole portfolios of securities on a frequent basis. To accomplish this, under one embodiment of the invention, the invention aggregates the orders entered by the investors utilizing the invention. The orders are aggregated not for the purpose of attempting to match one investor's order against another investor's order, but to reduce the number of actual transactions required to be executed by the system. The number of aggregations will depend on the number of investors of the system, their usage and other factors, but it is currently contemplated that orders would be aggregated into those received when the market is closed, those received in the morning, and those received in the afternoon, with transactions effected at the market open, mid-day and at the market close. If demand warrants, and other factors make it permissible, transactions could also be effected at other times—such as in the evening or more frequently during the day, if there is a market from which prices can be derived or if there is a market maker willing to make a market at that time and if it appears that effecting a transaction at such time would be consistent with the interests of investors. Similarly, the system operator (a bank or a broker, for example), could "pre-aggregate" some orders by executing against itself as principal and then hold the orders until a transaction window or until a certain amount was reached, etc. in order to execute the pre-aggregated orders. For example, the operator could take ten orders from ten customers and pre-aggregate all of them by executing against itself as those orders are received, and then take the bulk order position that it now owns and execute that as another order. This strategy means that the operator has to take upon itself market risk, and also has certain other disadvantages including potentially having to treat each trade as a reportable order for reporting purposes and other requirements, but it may be viable for certain small orders.

Shares can be bought in very, small odd lots (one or two shares), and even in fractions—purchases not possible on a cost-effective basis with ordinary brokerage.

All investor actions can be automated, with specified amounts being added each week or month from direct deposits and with selected stocks sold or bought depending on whether they satisfy certain criteria.

In subsequent sessions, the investor can modify his portfolio any way he wishes, including to reflect new preferences, add to it with additional dollars invested, or sell some or all of the securities in the portfolio.

The investor can also have the portfolio analyzed in connection with other investments the investor may have, such as funds or other investments held in other accounts, to review and modify a whole integrated portfolio.

The invention will track the tax "basis" and acquisition date in stock purchases, and which stocks have gains and which have losses: so an investor can choose to sell stocks to generate capital gains or losses (long or short term) and thereby manage tax effects.

Moreover, because the investor actually owns the individual securities in the portfolio, instead of just an interest in a fund, the investor has the right to vote the underlying stocks (or delegate the voting in accordance with various instructions), and sell individual stocks when he wishes.

The computer-based system of the present invention, therefore, provides complete "hands on" portfolio management for the investor who wishes it—those who employ discount brokerage, and those who select mutual funds on their own—and simple, automatic and expert management for an investor who wishes to be completely "taken care of".

The strengths and advantages of the invention include relative to mutual funds:
the selection of individual securities to be included in a portfolio;
management of and clearly superior tax effects;
the ability to make specific modifications to the portfolio at least three times a day, including the ability to buy and sell securities as a block at the open, mid-day or close instead of just at the next close as is the case with mutual funds;
the inclusion of world class securities or selection by sector, price/earnings ratio, governance policies, industry or other factors to suit investors' preferences at levels not available in mutual funds;
the ability to exercise voting and other shareholder and corporate governance rights and decisions—such as whether to tender securities in a takeover;
the ability to control selectively reinvestment of dividends;
the ability to fine-tune risk-return preferences with complete control over what will be included in the portfolio and whether there will be a change in investment strategy;
the ability to modify risk levels and portfolios with fewer potential costs or tax consequences;
the ability to view multiple investments more easily as fully integrated portfolio and manage it as such; and
the ability to manage costs better.

Those strengths and advantages relative to discount brokerages include:
inexpensive and cost-effective manner of creating a diversified portfolio;
ability to acquire small odd lots and fractional shares in multiple securities at reasonable costs;
far less cost in purchasing and selling individual securities (assuming immediate execution is not required)—as compared even to the deepest discount brokers;
ability to establish portfolio wide limitations and parameters such as required diversification of a portfolio and maximum risk levels;
monitoring of portfolio based-tax effects;
assistance in defining diversification and selection of stocks that satisfy diversification goals;
assistance in defining other factors and investor preferences and selection of stocks that satisfy those other preferences and goals; and
a likelihood of obtaining better execution than can be obtained through discount brokers due to matching of trades.

One exemplary embodiment of the present invention is for use in self-managed 401(k) accounts. By placing certain restrictions on the risk levels and a minimum number of assets/liabilities, the system can operate as a self-managed 401(k). For example, an employer may want to permit its employees to manage their own accounts, without incurring costs to the employer. So, once the plan is established, the individual accounts are billed a relatively low monthly fee (or small asset based fee) for enabling the user to be a self-managed account. But to protect the employer, the accounts would have certain restrictions placed on them so that an employee cannot invest all of his account into a single stock, for example, or create a portfolio with extremely high risk levels. The program can be set up to prevent execution of trades that violate these base parameters, and inform the user of the reason for non-execution.

Another exemplary embodiment of the present invention is for use by an existing brokerage company that permits its investors/customers to create a portfolio, as described above, and trade that portfolio via the brokerage company. Once the portfolios reach the central computer, they are broken down into their constituent trades. At this point, there are several possibilities. One, the trades can be aggregated, and netted against one another, leaving only a small number of shares to either be purchased or sold for each asset/liability. In this case, the brokerage company can undertake the risk that the stock will go up or down and simply reallocate the ownership of the stocks within the company and then at the end of the day (or several times throughout the day) execute a trade to remove any risk. Two, the trades can be continuously executed as they arrive, thereby reducing any risk. In this case, the investors are still investing portfolio's, but the company is handling the underlying transactions to implement the desired portfolios. Third, the trades can simply be aggregated until reaching a certain size (either in dollars or numbers of share), at which point they are executed.

Other Applications

The computer-based system of the present invention can be used by ordinary investors to manage other "things" such as options and commodities trading, bonds, foreign equities, or used for investment banking for the trading of, for example, derivatives. The computer-based system of the present invention can be used to establish a system to create and manage a portfolio of any assets or liabilities or combination thereof that can be traded, and provides benefits whenever diversification or utilization of portfolio concepts is an advantage (as would be the case with most financial assets). For example, as described above the invention could be used for any security, including foreign or domestic equities, options, warrants, bonds, notes, limited partnership interests, private placement securities or otherwise. In addition, the invention could be used for commodities, futures, bank loan syndication interests and novel assets or liabilities that are traded such as pollution rights (including global warming and air/water pollution rights) or insurance claim interests. The method of: 1) obtaining preferences for portfolio characteristics of investors; 2) employing those preferences to describe and select items to be transacted; 3) analyzing and transacting on such assets as a portfolio as opposed to as separate assets; 4) aggregating such transactions over an applicable characteristic, such as a time period (for example, every three hours) or a time certain (for example, at 9:30 am, 12:30 pm and 4:30 pm) or an amount (for example, having 1,000 transactions, or transactions totaling $5,000, aggregated) or otherwise; and 5) executing the transactions as aggregated and, if applicable, netted, transactions can be applied to any of these items.

In addition, obtaining investor risk preferences and other information allows for appropriately focused private placement and other opportunities to be presented to investors.

Furthermore, the present invention makes possible the diversification for smaller investors that venture capitalists obtain in private placement investment by investing in multiple private placements. For example, most venture capitalists invest in multiple private placements, which are normally high risk/rate return investments. By investing in several, the venture capitalists are able to reduce their risk because the likelihood increases that one of the private placements will be successful, thereby offsetting losses in the others.

The present invention makes possible this same opportunity, but at a lower scale, to smaller investors. For example, by enabling private placements to be listed as any other stock, the system enables the investor to select that private placement for investment. By selecting several of these, the investor can spread the risk across many of these investments, thereby reducing the overall risk.

What is claimed is:

1. A computer-implemented method for managing an investment account for a customer associated with a sponsoring organization comprising:
   providing a graphical user interface over a computer network for customer interaction;
   interacting with the customer over the computer network to create a portfolio of investments that satisfy a plurality of restrictions on investment activity of the customer while meeting pre-defined investment needs of the customer;
   establishing with a computer an aggregate portfolio of investments from the customer and from a plurality of other customers of the sponsoring organization, wherein said establishing an aggregate portfolio includes combining orders for investments from the customer and from the plurality of other customers into a single order for each investment, including combining at least one order including a fractional share, a single share or an odd lot of shares for an investment; and
   transmitting a portfolio of desired investments over the computer network for execution;
   wherein the investments from the customer are owned directly by the customer in the customer's portfolio as a result of said execution.

2. The method according to claim 1, wherein said at least one order includes at least one trading order for a single share of one investment.

3. The method according to claim 1, wherein said at least one trading order includes at least one trading order for a fractional share of one investment.

4. The method according to claim 1, wherein said at least one trading order includes at least one trading order for an odd lot of shares of one investment.

5. A computer-implemented method for managing a plurality of investment accounts owned by a plurality of investors, each account being associated with a third party user, comprising:
   receiving data from the user via a computer network regarding the plurality of investment accounts, the data defining the amount and types of investments to be included in each investment account;
   aggregating with a computer the plurality of investment accounts into a single portfolio of investments for the user;
   establishing with the computer an aggregate portfolio of investments from the third party user and from a plurality of other users, wherein said establishing an aggregate portfolio includes combining orders for investments from the third party user and from the plurality of other users into a single order for each investment, including combining at least one order including a fractional share, a single share or an odd lot of shares for an investment; and
   analyzing with the computer the single portfolio to determine a risk/reward characteristic of the single portfolio;
   wherein the investments in each account are owned directly by the investor that owns the account.

6. The method according to claim 5, wherein said at least one order includes at least one trading order for a single share of one investment.

7. The method according to claim 5, wherein said at least one order includes at least one trading order for a fractional share of one investment.

8. The method according to claim 5, wherein said at least one order includes at least one trading order for an odd lot of shares of one investment.

* * * * *

UNITED STATES PATENT AND TRADEMARK OFFICE
CERTIFICATE OF CORRECTION

PATENT NO. : 8,275,690 B2  
APPLICATION NO. : 12/701286  
DATED : September 25, 2012  
INVENTOR(S) : Steven M. H. Wallman Page 1 of 1

It is certified that error appears in the above-identified patent and that said Letters Patent is hereby corrected as shown below:

On the title page, at item (73) Assignee, change the name of the Assignee from "FOLIOn, Inc." to -- FOLIOfn, Inc. --.

Signed and Sealed this  
Ninth Day of December, 2014

Michelle K. Lee  
*Deputy Director of the United States Patent and Trademark Office*